US010012830B2

(12) United States Patent
Miyatake et al.

(10) Patent No.: US 10,012,830 B2
(45) Date of Patent: Jul. 3, 2018

(54) OPTICAL SCANNING DEVICE AND IMAGE FORMING APPARATUS

(71) Applicants: Naoki Miyatake, Kanagawa (JP); Yukihisa Yokoyama, Kanagawa (JP)

(72) Inventors: Naoki Miyatake, Kanagawa (JP); Yukihisa Yokoyama, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/716,009

(22) Filed: May 19, 2015

(65) Prior Publication Data

US 2015/0346487 A1 Dec. 3, 2015

(30) Foreign Application Priority Data

May 27, 2014 (JP) ................................. 2014-108639

(51) Int. Cl.
*G02B 26/12* (2006.01)
*G02B 26/10* (2006.01)
*H04N 1/04* (2006.01)

(52) U.S. Cl.
CPC ......... *G02B 26/125* (2013.01); *G02B 26/123* (2013.01); *G02B 26/124* (2013.01); *H04N 1/04* (2013.01)

(58) Field of Classification Search
CPC .... G02B 26/10; G02B 26/105; G02B 26/123; G02B 26/124; G02B 26/125;
(Continued)

(56) References Cited

U.S. PATENT DOCUMENTS 5,680,254 A 10/1997 Ueda et al.
6,141,118 A 10/2000 Yamawaki et al.
(Continued)

FOREIGN PATENT DOCUMENTS

JP 2001-021823 A 1/2001
JP 3450653 7/2003
(Continued)

OTHER PUBLICATIONS

Office Action dated Mar. 27, 2018 in corresponding Japanese Patent Application No. 2014-108639.

*Primary Examiner* — Jie Lei
(74) *Attorney, Agent, or Firm* — Oblon, McClelland, Maier & Neustadt, L.L.P.

(57) ABSTRACT

An optical scanning device includes plural light sources, a light deflector including a deflecting-reflecting surface, and a scanning optical system including plural folding mirrors and plural scanning lenses, wherein the plural scanning lenses have the same shape, at least one of an optical surface at the incidence side and an optical surface at the emission side has an asymmetric shape with respect to a sub-scanning direction, and has an asymmetric shape in the sub-scanning direction with respect to the main scanning direction, and a difference in a number of folding mirrors disposed between the corresponding scanning lens and the light deflector between light incident on the light deflector from a direction inclined to one side relative to a virtual surface including a normal line of the deflecting-reflecting surface and light incident on the light deflector from a direction inclined to the other side is an odd number.

8 Claims, 20 Drawing Sheets

(58) Field of Classification Search
CPC ....... G02B 13/0005; B41J 2/451; B41J 2/471; G11B 7/0037; G03G 15/04036; H04N 1/04
USPC ......... 359/204.1, 216.1, 201.1, 201.2, 201.4, 359/205.1, 662; 347/224, 243, 244, 258, 347/263; 399/220, 221
See application file for complete search history.

(56) References Cited

U.S. PATENT DOCUMENTS

| | | | |
|---|---|---|---|
| 7,126,735 | B1 | 10/2006 | Kinoshita et al. |
| 7,154,651 | B2 | 12/2006 | Atsuumi et al. |
| 7,161,724 | B1 | 1/2007 | Miyatake |
| 7,411,712 | B2 | 8/2008 | Nakajima et al. |
| RE42,865 | E | 10/2011 | Suzuki et al. |
| 2002/0001118 | A1 | 1/2002 | Nakajima et al. |
| 2002/0149666 | A1 | 10/2002 | Amada et al. |
| 2003/0156310 | A1 | 8/2003 | Suzuki et al. |
| 2003/0206322 | A1 | 11/2003 | Atsuumi et al. |
| 2003/0214693 | A1 | 11/2003 | Hayashi et al. |
| 2004/0001241 | A1 | 1/2004 | Hayashi et al. |
| 2004/0165240 | A1 | 8/2004 | Suzuki et al. |
| 2004/0240000 | A1 | 12/2004 | Miyatake et al. |
| 2005/0094234 | A1 | 5/2005 | Miyatake et al. |
| 2006/0000990 | A1 | 1/2006 | Hayashi et al. |
| 2006/0203264 | A1 | 9/2006 | Miyatake |
| 2006/0209166 | A1 | 9/2006 | Suzuki et al. |
| 2007/0002417 | A1 | 1/2007 | Hirakawa et al. |
| 2007/0030538 | A1 | 2/2007 | Hirakawa et al. |
| 2007/0081216 | A1 | 4/2007 | Miyatake |
| 2007/0146849 | A1 | 6/2007 | Miyatake et al. |
| 2007/0215800 | A1 | 9/2007 | Miyatake et al. |
| 2007/0216754 | A1 | 9/2007 | Miyatake |
| 2008/0062491 | A1 | 3/2008 | Nakamura et al. |
| 2008/0062493 | A1 | 3/2008 | Miyatake |
| 2008/0068691 | A1 | 3/2008 | Miyatake |
| 2008/0180772 | A1 | 7/2008 | Miyatake et al. |
| 2009/0073528 | A1 | 3/2009 | Miyatake |
| 2009/0168132 | A1 | 7/2009 | Miyatake |
| 2010/0014892 | A1* | 1/2010 | Shimomura ......... G02B 26/123 399/221 |
| 2010/0091083 | A1 | 4/2010 | Itami et al. |
| 2011/0063704 | A1 | 3/2011 | Miyatake |
| 2012/0177409 | A1 | 7/2012 | Arai et al. |
| 2012/0236380 | A1 | 9/2012 | Miyatake et al. |
| 2013/0083148 | A1 | 4/2013 | Miyatake et al. |
| 2013/0147895 | A1 | 6/2013 | Miyatake |
| 2014/0009555 | A1 | 1/2014 | Itami et al. |
| 2014/0204166 | A1 | 7/2014 | Itami et al. |
| 2015/0097910 | A1 | 4/2015 | Itami et al. |

FOREIGN PATENT DOCUMENTS

| | | |
|---|---|---|
| JP | 2006-323278 A | 11/2006 |
| JP | 4057099 | 12/2007 |
| JP | 2008-020473 A | 1/2008 |
| JP | 4098851 | 3/2008 |
| JP | 2010-026055 A | 2/2010 |

* cited by examiner

FIG.19
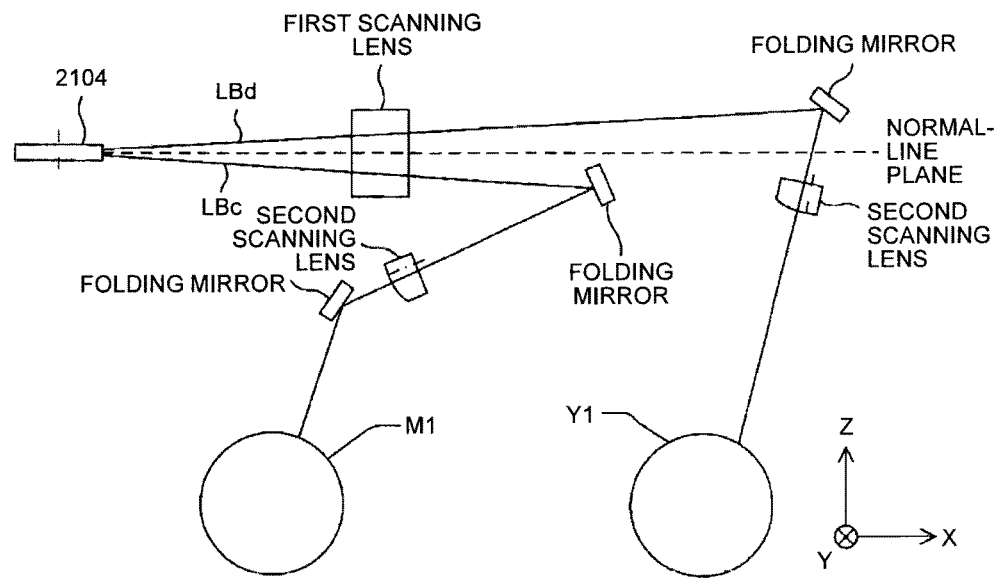
FIG.20A    FIG.20B
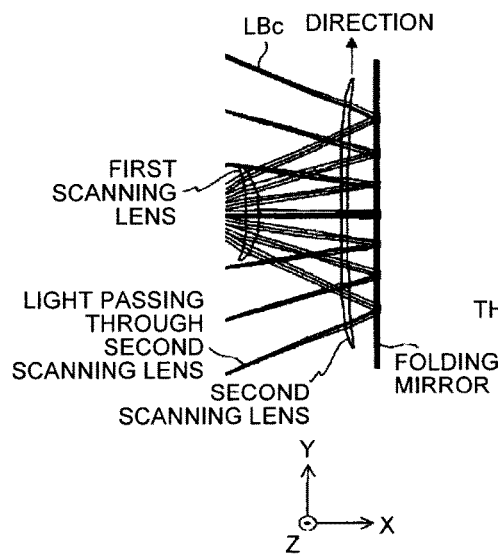
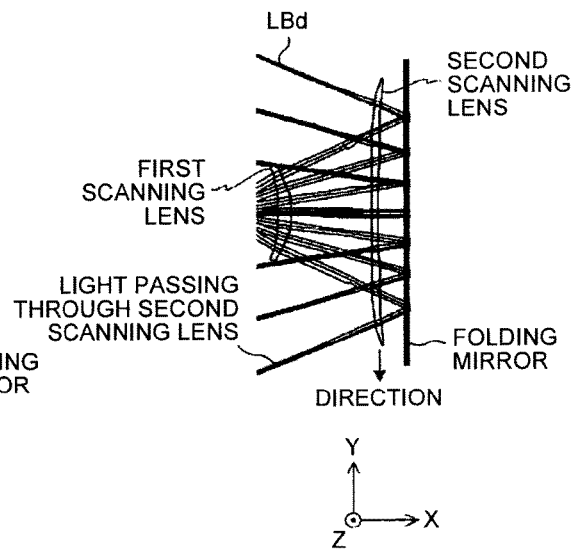

FIG.21
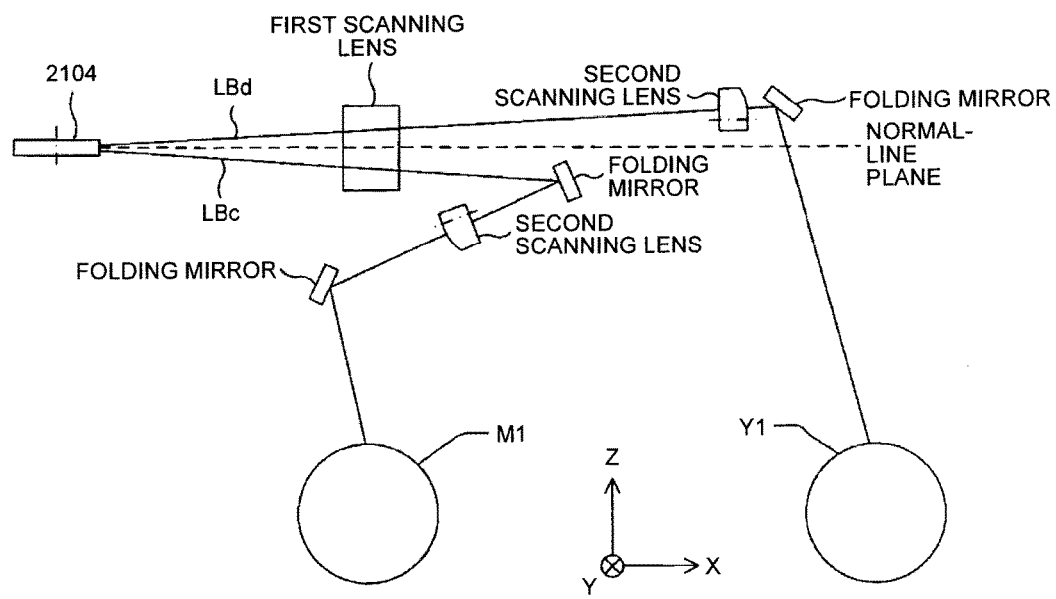
FIG.22A              FIG.22B
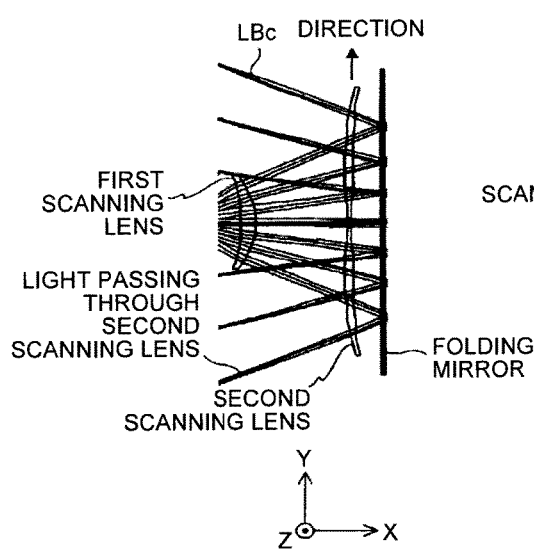 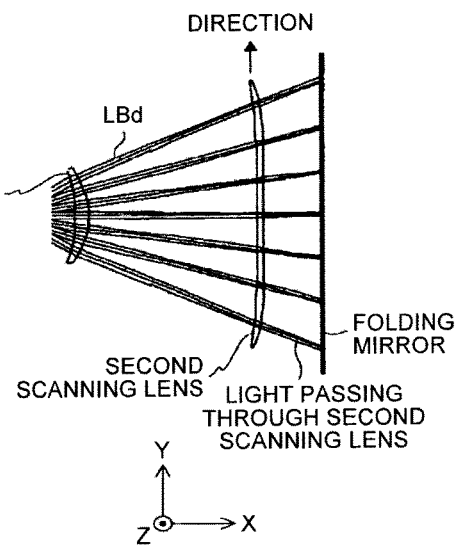

OPTICAL SCANNING DEVICE AND IMAGE FORMING APPARATUS

CROSS-REFERENCE TO RELATED APPLICATION(S)

The present application claims priority to and incorporates by reference the entire contents of Japanese Patent Application No. 2014-108639 filed in Japan on May 27, 2014.

BACKGROUND OF THE INVENTION

1. Field of the Invention

The present invention relates to an optical scanning device and an image forming apparatus, and more particularly to an optical scanning device that scans a surface to be scanned with light, and an image forming apparatus provided with the optical scanning device.

2. Description of the Related Art

An optical scanning device has widely been known in association with an image forming apparatus such as a laser printer. The optical scanning device includes a light source, a light deflector, a scanning optical system, and the like. The light deflector has a deflecting-reflecting surface, and deflects light emitted from the light source. The scanning optical system collects light deflected by the light deflector toward the surface to be scanned. A light spot formed on the surface to be scanned moves in a main scanning direction with the rotation of the light deflector. A substantial surface to be scanned is a photoconductive surface of an image bearer.

With recent colorization and increase in operation speed, an image forming apparatus of a tandem system including a plurality of photoconductor drums serving as image bearers has been widespread.

In an image forming apparatus of a tandem system, a plurality of photoconductor drums are disposed along a conveying direction of a recording paper. A plurality of lights emitted from a plurality of light sources, each corresponding to each of the plurality of photoconductor drums, is deflected by one light deflector, split by a folding mirror of a scanning optical system, and guided to the corresponding photoconductor drum to form a latent image. The latent images formed on the surfaces of the respective photoconductor drums are made visible with developers of different colors, sequentially superimposed with one another on the same recording paper, transferred, and then, fixed to become a color image.

Notably, upon an incidence of light emitted from a light source to a light deflector, a system in which light is introduced from an oblique direction with respect to a virtual plane including a normal line of a deflecting-reflecting surface is also referred to as an "oblique incidence system", and a system in which light is introduced from a direction parallel to the virtual plane is also referred to as a "horizontal incidence system".

Further, an optical system provided between the light source and the light deflector is referred to as a "pre-deflector optical system", and a pre-deflector optical system used for the oblique incidence system is especially referred to as an "oblique incidence optical system".

For example, Japanese Patent No. 4057099, Japanese Patent No. 4098851 and Japanese Patent No. 3450653 describe an optical scanning device using an oblique incidence optical system.

Recently, a compact image forming apparatus with excellent image quality has been demanded. However, the image forming apparatuses provided with the optical scanning devices described in Japanese Patent No. 4057099, Japanese Patent No. 4098851 and Japanese Patent No. 3450653 hardly achieve both miniaturization and improvement in image quality.

SUMMARY OF THE INVENTION

It is an object of the present invention to at least partially solve the problems in the conventional technology.

The present invention provides an optical scanning device that individually scans a plurality of surfaces to be scanned with a plurality of lights in a main scanning direction. The optical scanning device includes a plurality of light sources, each of which corresponds to each of the plurality of surfaces to be scanned, a light deflector which includes at least one deflecting-reflecting surface, and on which a plurality of lights emitted from the plurality of light sources is incident from a direction inclined relative to a virtual plane that includes a normal line of the deflecting-reflecting surface and is orthogonal to the deflecting-reflecting surface, and a scanning optical system including a plurality of folding mirrors and a plurality of scanning lenses, each of the plurality of scanning lenses corresponding to each of the plurality of surfaces to be scanned, the scanning optical system guiding each of the plurality of lights deflected by the light deflector to each of the plurality of surfaces to be scanned. The optical scanning device is characterized in that the plurality of scanning lenses has the same shape, at least one of an optical surface at the incidence side and an optical surface at the emission side has an asymmetric shape with respect to a sub-scanning direction orthogonal to the main scanning direction, and has an asymmetric shape in the sub-scanning direction with respect to the main scanning direction, and a difference in a number of folding mirrors disposed between the corresponding scanning lens and the light deflector between light incident on the light deflector from a direction inclined to one side relative to the virtual plane and light incident on the light deflector from a direction inclined to the other side is an odd number.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a view for describing a comparative example of the scanning optical system B;

FIGS. 20A and 20B each are views for describing a direction of the second scanning lens with respect to a main-scanning corresponding direction in the comparative example of the scanning optical system B;

FIG. 21 is a view for describing a modification of the scanning optical system B;

FIGS. 22A and 22B each are views for describing a direction of the second scanning lens with respect to a main-scanning corresponding direction in the modification of the scanning optical system B;

DETAILED DESCRIPTION OF THE PREFERRED EMBODIMENTS

Figure 1:
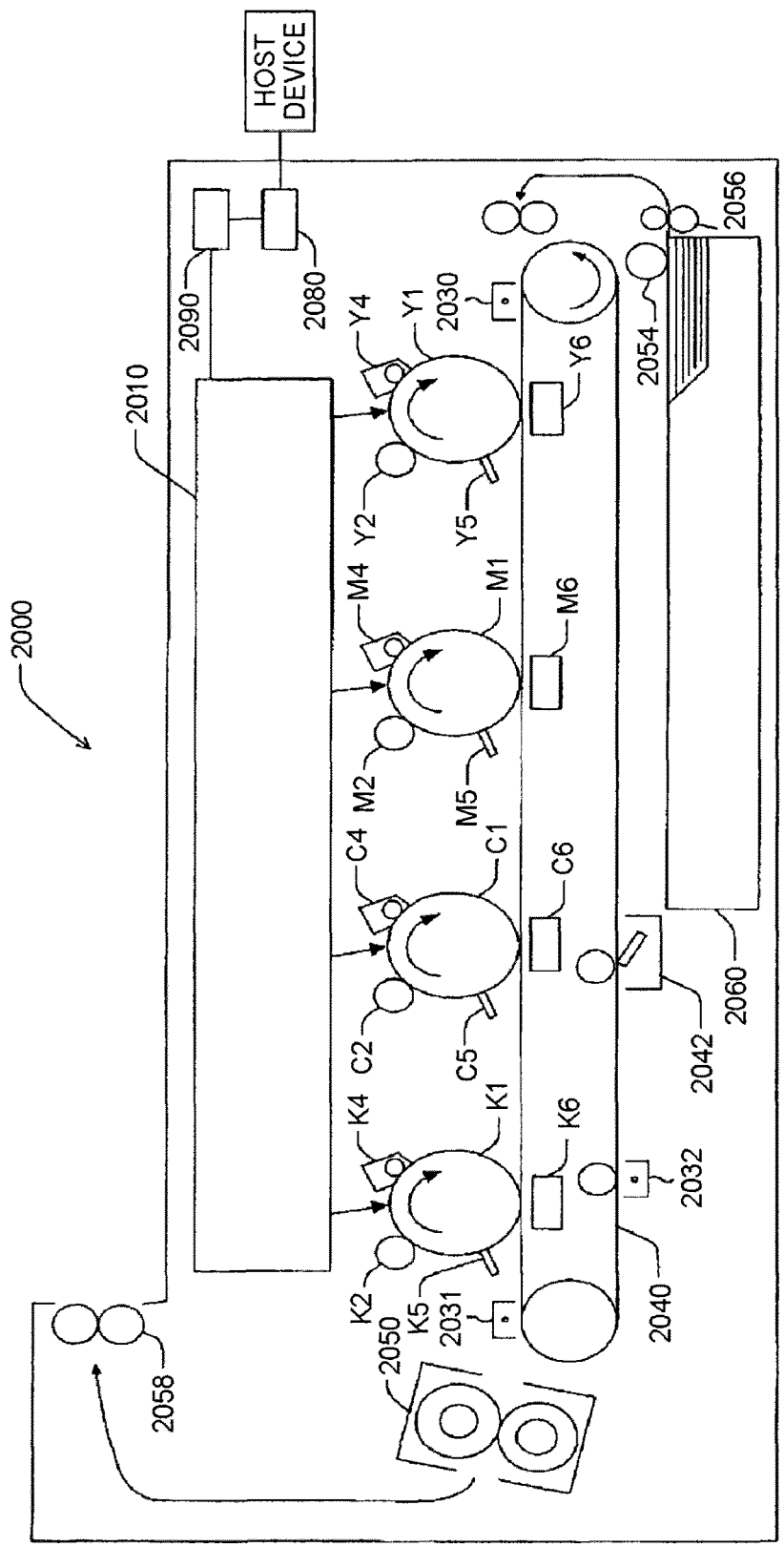
FIG. 1 is a view for describing a schematic configuration of a color printer according to one embodiment of the present invention.

An optical scanning device used for an image forming apparatus of a tandem system includes an optical scanning device having an oblique incidence optical system. In this optical scanning device, light from a light source is incident on a light deflector from a direction inclined with respect to a virtual plane including a normal line of a deflecting-reflecting surface of the light deflector. An inclination angle in this case is also referred to as an "oblique incidence angle".

This configuration has an advantage such that not an expensive two-stage polygon mirror or a thick polygon mirror but a low-cost polygon mirror with a small size in a direction parallel to a rotation axis can be used.

However, the oblique incidence system has a disadvantage of a large "scanning line curvature" on a surface to be scanned. The degree of the scanning line curvature is different depending on the oblique incidence angle. Therefore, a color shift might be generated when a plurality of latent images are made visible, and then, superimposed with one another.

For example, Japanese Patent No. 4057099 and Japanese Patent No. 4098851 describe an optical scanning device aiming for a correction of the "scanning line curvature". In addition, Japanese Patent No. 3450653 describes an optical scanning device aiming for a correction of "scanning line curvature and deterioration in wave aberration", for example.

An incidence position and an emission position of light in a scanning optical system change with a rotation of a light deflector. For avoiding complexity, the change in the incidence position and emission position is also referred to as a "scanning trajectory".

In an optical scanning device having an oblique incidence optical system, a scanning trajectory in the scanning optical system is bent in a sub-scanning direction, resulting in that a scanning line curvature occurs due to a change in curvature or thickness caused by a temperature change in the scanning optical system or due to a change in an incidence height of incident light caused by a temperature change in the scanning optical system. Specifically, in the optical scanning device having the oblique incidence optical system, a scanning line curvature occurs due to a temperature change. In an optical scanning device having a horizontal incidence optical system, a scanning line curvature caused by a temperature change does not occur or is very small, since a scanning trajectory in the scanning optical system is almost parallel to a main scanning direction.

When a generatrix is curved or a lens is warped upon forming a scanning lens even if a scanning line curvature is to be corrected upon designing, a scanning line curvature occurs.

Japanese Patent No. 4057099, Japanese Patent No. 4098851 and Japanese Patent No. 3450653 aim at reducing a scanning line curvature upon designing, but do not consider a scanning line curvature caused by a temperature change or a scanning line curvature caused by a processing error or assembly error.

One embodiment of the present invention will be described below with reference to FIGS. 1 to 28. FIG. 1 illustrates a schematic configuration of a color printer 2000 according to one embodiment.

This color printer 2000 is a tandem-system color printer forming a multicolor image by superimposing four colors (black, cyan, magenta, and yellow), and includes four photoconductor drums (K1, C1, M1, Y1), four drum charging devices (K2, C2, M2, Y2), four developing devices (K4, C4, M4, Y4), four drum cleaning devices (K5, C5, M5, Y5), four transfer devices (K6, C6, M6, Y6), an optical scanning device 2010, a belt charging device 2030, a belt separation device 2031, a belt discharging device 2032, a conveyance belt 2040, a belt cleaning device 2042, a fixing device 2050, a paper feeding roller 2054, a pair of registration rollers 2056, a paper ejection roller 2058, a paper feeding tray 2060, a communication control device 2080, and a printer control device 2090 that generally controls the above components.

The communication control device 2080 controls bidirectional communication with a host device (e.g., personal computer) through a network.

The printer control device 2090 notifies the optical scanning device 2010 of multicolor image information received from the host device via the communication control device 2080.

The photoconductor drum K1, the drum charging device K2, the developing device K4, the drum cleaning device K5, and the transfer device K6 are used as a set, and form an image forming station (hereinafter also referred to as "K station" for convenience) for forming a black image.

The photoconductor drum C1, the drum charging device C2, the developing device C4, the drum cleaning device C5, and the transfer device C6 are used as a set, and form an image forming station (hereinafter also referred to as "C station" for convenience) for forming a cyan image.

The photoconductor drum M1, the drum charging device M2, the developing device M4, the drum cleaning device M5, and the transfer device M6 are used as a set, and form an image forming station (hereinafter also referred to as "M station" for convenience) for forming a magenta image.

The photoconductor drum Y1, the drum charging device Y2, the developing device Y4, the drum cleaning device Y5, and the transfer device Y6 are used as a set, and form an image forming station (hereinafter also referred to as "Y station" for convenience) for forming a yellow image.

Each of the photoconductor drums has a photoconductive layer on its surface. Specifically, the surface of each of the photoconductor drums is a surface to be scanned. Notably, each of the photoconductor drums rotates in a direction of an arrow in a plane of FIG. 1 by a rotation mechanism not illustrated.

Each of the drum charging devices uniformly charges the surface of the corresponding photoconductor drum.

The optical scanning device 2010 irradiates the charged surface of the corresponding photoconductor drum with light, which is modulated for each color, based on the multicolor image information (black image information, magenta image information, cyan image information, and yellow image information) from the printer control device 2090. With this, a latent image corresponding to the image information is formed on the surface of each of the photoconductor drums. The formed latent image moves toward the corresponding developing device with the rotation of the photoconductor drum. The configuration of the optical scanning device 2010 will be described later.

Meanwhile, a region, scanned with light, of each of the photoconductor drums is called a "scanned region", and a region where image information is written in the scanned region is called an "effective scanned region", an "image forming region", or an "effective image region", for example. A direction parallel to the rotation axis of each of the photoconductor drums is called a "main scanning direction", and the rotation direction of the photoconductor drum is called a "sub-scanning direction".

The developing device K4 deposits black toner onto the latent image formed on the surface of the photoconductor drum K1 to make this latent image visible.

The developing device C4 deposits cyan toner onto the latent image formed on the surface of the photoconductor drum C1 to make this latent image visible.

The developing device M4 deposits magenta toner onto the latent image formed on the surface of the photoconductor drum M1 to make this latent image visible.

The developing device Y4 deposits yellow toner onto the latent image formed on the surface of the photoconductor drum Y1 to make this latent image visible.

An image (hereinafter referred to as a "toner image" for convenience) on which toner is deposited by each developing device moves toward the corresponding transfer device with the rotation of the photoconductor drum.

Recording papers are stored in the paper feeding tray 2060. The paper feeding roller 2054 is disposed in the vicinity of the paper feeding tray 2060, and the paper feeding roller 2054 picks up the recording paper one by one from the paper feeding tray 2060, and conveys the recording paper to the pair of the registration rollers 2056. The pair of the registration rollers 2056 feeds the recording paper to the conveyance belt 2040 at a predetermined timing.

The yellow, magenta, cyan, and black toner images are sequentially transferred onto the recording paper on the conveyance belt 2040 by the corresponding transfer device at a predetermined timing, and superimposed with one another to form a color image. Then, the recording paper is sent to the fixing device 2050.

The fixing device 2050 applies heat and pressure to the recording paper, whereby the toner is fixed onto the recording paper. This recording paper is conveyed to a paper ejection tray by the paper ejection roller 2058, and sequentially stacked onto the paper ejection tray.

Each of the drum cleaning devices removes toner (residual toner) remaining on the surface of the corresponding photoconductor drum. The surface of the photoconductor drum from which the residual toner is removed is again returned to the position opposite to the corresponding charging device.

The belt charging device 2030 charges the surface of the conveyance belt 2040. With this, the recording paper is electrostatically adsorbed to the surface of the conveyance belt 2040.

The belt separation device 2031 releases the adsorption of the recording paper electrostatically adsorbed to the conveyance belt 2040.

A belt discharging device 2032 discharges the surface of the conveyance belt 2040.

The belt cleaning device 2042 removes foreign matters deposited onto the surface of the conveyance belt 2040.

Next, the configuration of the optical scanning device 2010 will be described.

Figure 2:
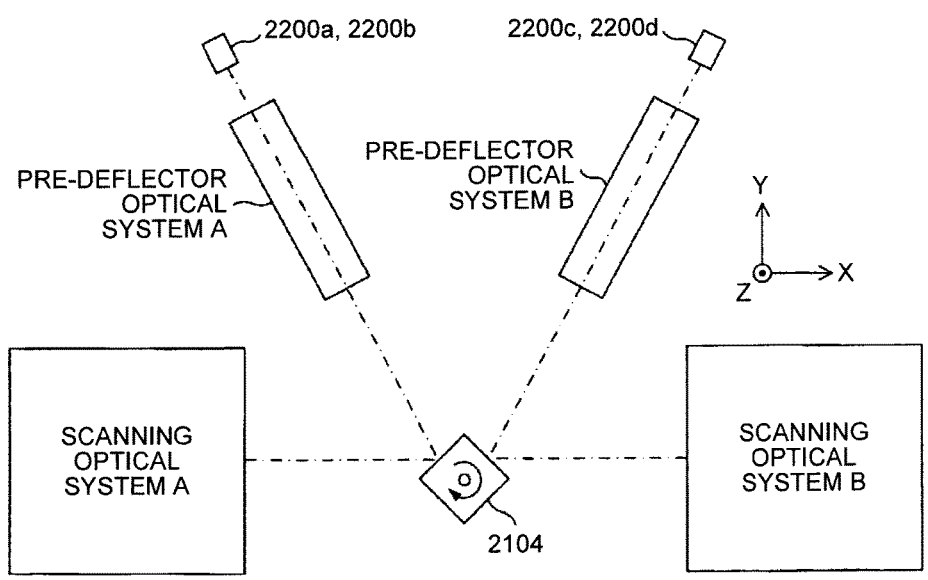
FIG. 2 is a view for describing a schematic configuration of an optical scanning device.

As illustrated in FIG. 2 as one example, the optical scanning device 2010 includes four light sources (2200a, 2200b, 2200c, 2200d), a pre-deflector optical system A, a pre-deflector optical system B, a polygon mirror 2104, a scanning optical system A, a scanning optical system B, a scan control device not illustrated, and the like.

Each of the four light sources (2200a, 2200b, 2200c, 2200d) individually corresponds to each of the four photoconductor drums (K1, C1, M1, Y1). Here, the light source 2200a corresponds to the photoconductor drum K1, the light source 2200b corresponds to the photoconductor drum C1, the light source 2200c corresponds to the photoconductor drum M1, and the light source 2200d corresponds to the photoconductor drum Y1.

In the present specification, the direction along the longitudinal direction (direction of the rotation axis) of each photoconductor drum is defined as a Y axis direction, and the direction along the rotation axis of the polygon mirror 2104 is defined as a Z axis direction in XYZ three-dimensional orthogonal coordinate system in the description. Further, for convenience, the direction corresponding to the main scanning direction is abbreviated as a "main-scanning corresponding direction", and the direction corresponding to the sub-scanning direction is abbreviated as a "sub-scanning corresponding direction" in each optical component in the description below.

Each light source has a semiconductor laser (LD) or a vertical cavity surface emitting laser (VCSEL) with an oscillation wavelength of 659 nm.

Figure 3:
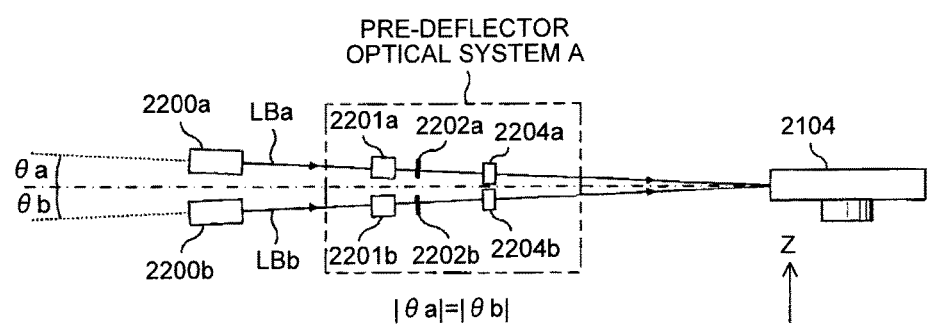
FIG. 3 is a view for describing a pre-deflector optical system A.

As illustrated in FIG. 3 as one example, the pre-deflector optical system A has two coupling lenses (2201a, 2201b), two aperture plates (2202a, 2202b), and two cylindrical lenses (2204a, 2204b).

The coupling lens 2201a is disposed on an optical path of light LBa emitted from the light source 2200a, and allows this light to become almost parallel light. The coupling lens 2201b is disposed on an optical path of light LBb emitted from the light source 2200b, and allows this light to become almost parallel light.

The aperture plate 2202a has an aperture portion, and shapes the light LBa through the coupling lens 2201a. The aperture plate 2202b has an aperture portion, and shapes the light LBb through the coupling lens 2201b.

The cylindrical lens 2204a focuses the light LBa passing through the aperture portion of the aperture plate 2202a on the portion near the deflecting-reflecting surface of the polygon mirror 2104 with respect to the Z axis direction. The cylindrical lens 2204b focuses the light LBb passing through the aperture portion of the aperture plate 2202b on the portion near the deflecting-reflecting surface of the polygon mirror 2104 with respect to the Z axis direction.

Figure 4:
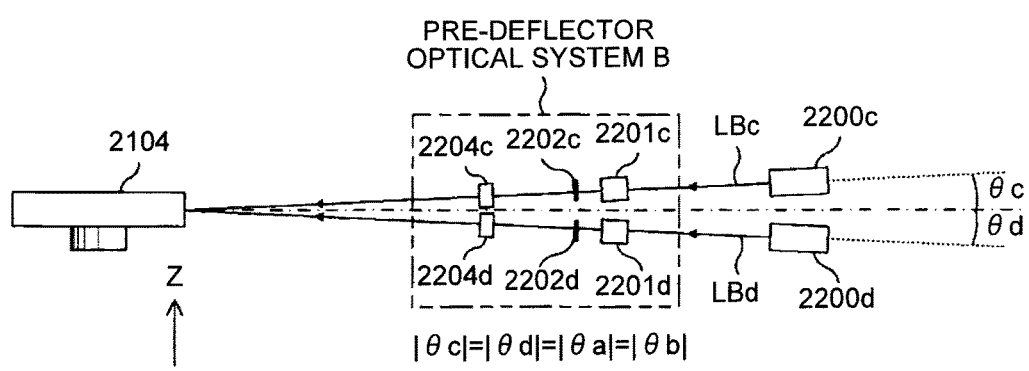
FIG. 4 is a view for describing a pre-deflector optical system B.

As illustrated in FIG. 4 as one example, the pre-deflector optical system B has two coupling lenses (2201c, 2201d), two aperture plates (2202c, 2202d), and two cylindrical lenses (2204c, 2204d).

The coupling lens 2201c is disposed on an optical path of light LBc emitted from the light source 2200c, and allows this light to become almost parallel light. The coupling lens 2201d is disposed on an optical path of light LBd emitted from the light source 2200d, and allows this light to become almost parallel light.

The aperture plate 2202c has an aperture portion, and shapes the light LBc through the coupling lens 2201c. The aperture plate 2202d has an aperture portion, and shapes the light LBd through the coupling lens 2201d.

The cylindrical lens 2204c focuses the light LBc passing through the aperture portion of the aperture plate 2202c on the portion near the deflecting-reflecting surface of the polygon mirror 2104 with respect to the Z axis direction. The cylindrical lens 2204d focuses the light LBd passing through the aperture portion of the aperture plate 2202d on the portion near the deflecting-reflecting surface of the polygon mirror 2104 with respect to the Z axis direction.

Figure 5A:
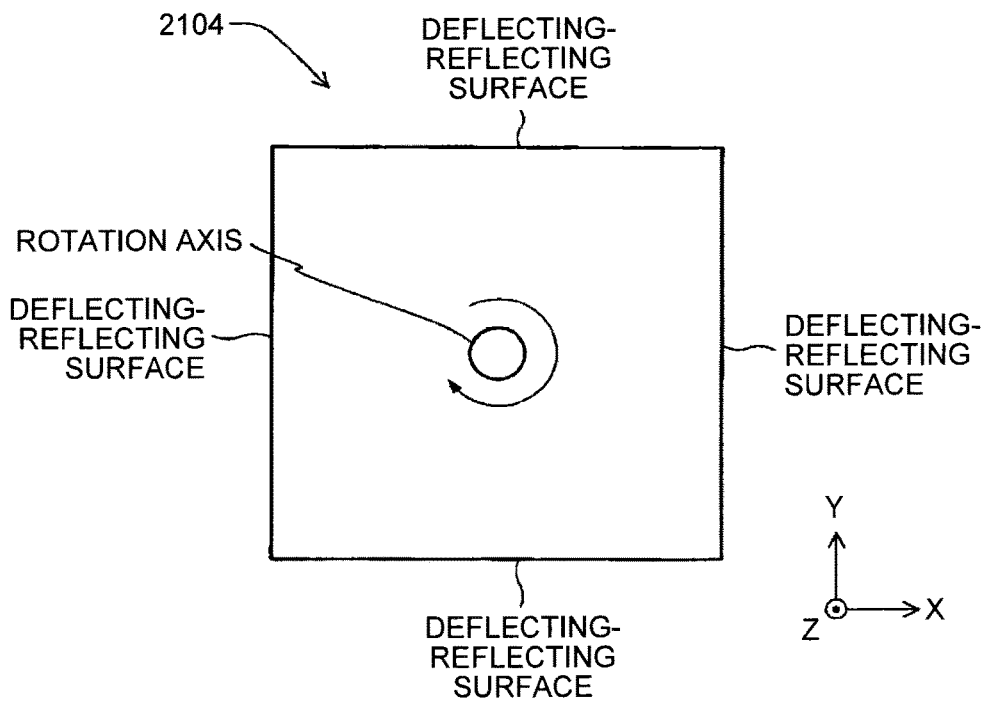
FIGS. 5A and 5B each are views for describing a polygon mirror.
Figure 5B:
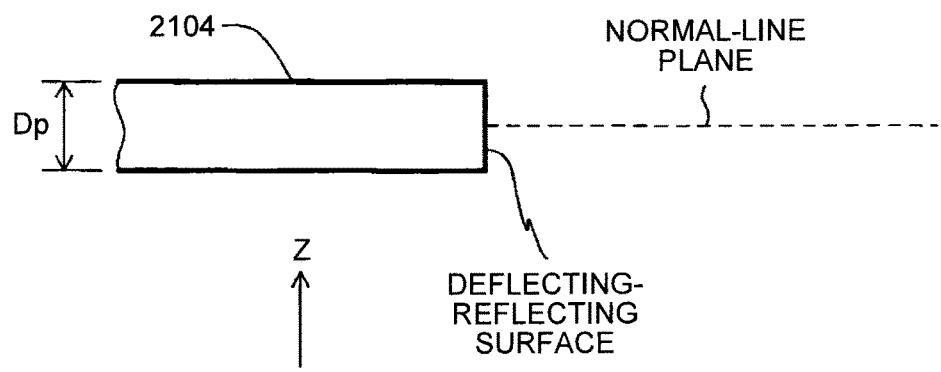

The polygon mirror 2104 has four deflecting-reflecting surfaces parallel to the Z axis (see FIGS. 5A and 5B). The four deflecting-reflecting surfaces rotate about the rotation axis parallel to the Z axis at constant speed to deflect light from each cylindrical lens at constant angular velocity.

The length (Dp in FIG. 5B, hereinafter also referred to as a "thickness of the deflecting-reflecting surface") of the deflecting-reflecting surface in the Z axis direction is about 4 mm. For avoiding complexity, a virtual plane including a normal line at the center of the deflecting-reflecting surface and orthogonal to the deflecting-reflecting surface is also referred to as a "normal-line plane".

The light LBa from the cylindrical lens 2204a and the light LBb from the cylindrical lens 2204b are incident on the same deflecting-reflecting surface of the polygon mirror 2104 on the −X axis.

Returning to FIG. 3, the light LBa is set to be incident on the deflecting-reflecting surface from the direction inclined toward the +Z axis side at an angle of θa with respect to the normal-line plane, while the light LBb is set to be incident on the deflecting-reflecting surface from the direction inclined toward the −Z axis side at an angle of θb with respect to the normal-line plane. Specifically, the light LBa and the light LBb are obliquely incident on the same deflecting-reflecting surface. Therefore, the pre-deflector optical system A is an oblique incidence optical system.

The light LBc from the cylindrical lens 2204c and the light LBd from the cylindrical lens 2204d are incident on the same deflecting-reflecting surface of the polygon mirror 2104 on the +X axis side.

As illustrated in FIG. 4, the light LBc is set to be incident on the deflecting-reflecting surface from the direction inclined toward the +Z axis side at an angle of θc with respect to the normal-line plane, while the light LBd is set to be incident on the deflecting-reflecting surface from the direction inclined toward the −Z axis side at an angle of θd with respect to the normal-line plane. Specifically, the light LBc and the light LBd are obliquely incident on the same deflecting-reflecting surface. Therefore, the pre-deflector optical system B is an oblique incidence optical system.

For avoiding complexity, the case where a plurality of lights is incident on the deflecting-reflecting surface from the same side with respect to the normal-line plane is specified such that "the oblique incidence direction is the same", and the case where a plurality of lights is incident on the deflecting-reflecting surface from the different side with respect to the normal-line plane is specified such that "the oblique incidence direction is different". For example, the oblique incidence direction is different between the light LBa and the light LBb, while the oblique incidence direction is the same between the light LBa and the light LBc. In addition, the oblique incidence direction is different between the light LBa and the light LBd. Further, the oblique incidence direction is different between the light LBb and the light LBc, and the oblique direction is the same between the light LBb and the light LBd. The oblique incidence direction is different between the light LBc and the light LBd.

As a method of obliquely introducing light into the polygon mirror 2104, the light source, the coupling lens, and the cylindrical lens are disposed as inclined with respect to the XY plane according to the oblique incidence angle in the present embodiment. However, the configuration is not limited thereto. For example, it may be configured such that light is emitted parallel to the XY plane from the light source, and the cylindrical lens is shifted in the sub-scanning corresponding direction, or such that a reflection mirror is used.

Figure 6:
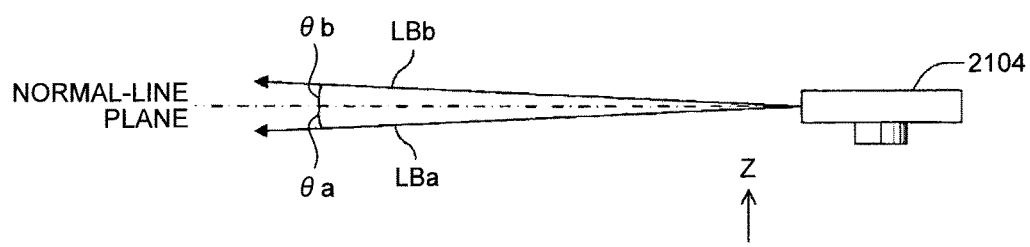
FIG. 6 is a view for describing optical paths of two lights (LBa, LBb) deflected by the polygon mirror.

As illustrated in FIG. 6, the light LBa incident on the deflecting-reflecting surface is reflected in the direction inclined toward the −Z side with respect to the normal-line plane at the angle θa, while the light LBb incident on the deflecting-reflecting surface is reflected in the direction inclined toward the +Z side with respect to the normal-line plane at the angle θb.

Figure 7:
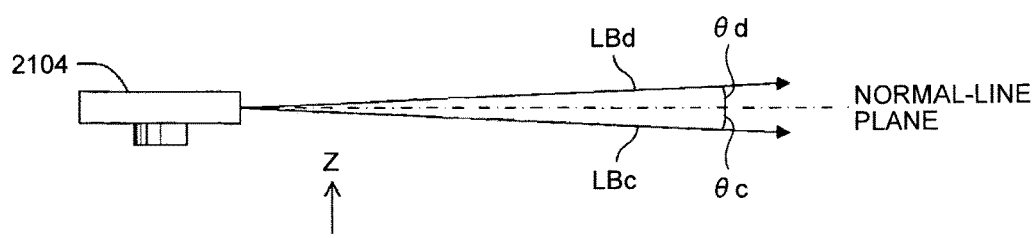
FIG. 7 is a view for describing optical paths of two lights (LBc, LBd) deflected by the polygon mirror.

As illustrated in FIG. 7, the light LBc incident on the deflecting-reflecting surface is reflected in the direction inclined toward the −Z side with respect to the normal-line plane at the angle θc, while the light LBd incident on the deflecting-reflecting surface is reflected in the direction inclined toward the +Z side with respect to the normal-line plane at the angle θd.

Here, as one example, |θa|=|θb|=|θc|=|θd|=1°.

Figure 8:
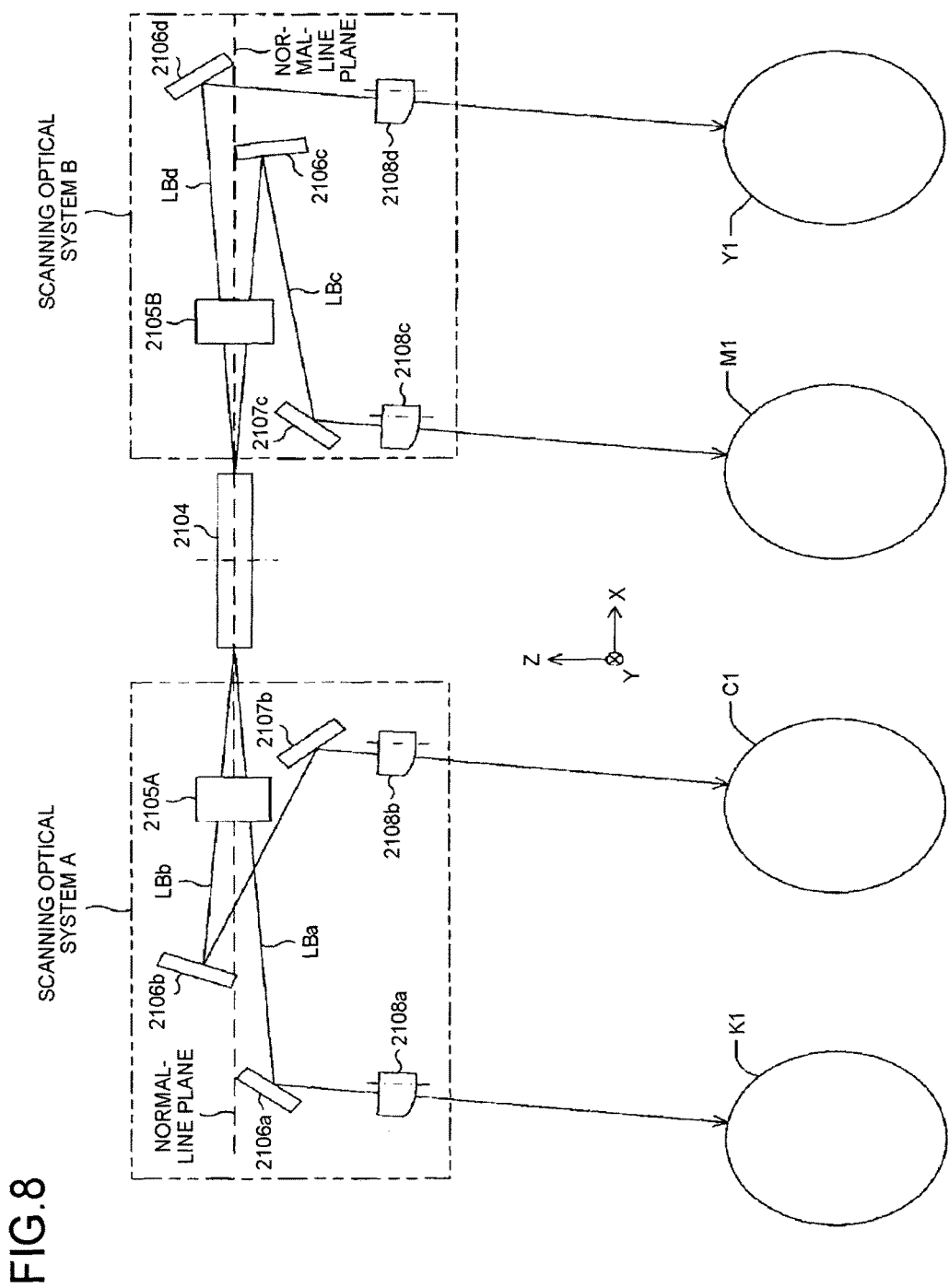
FIG. 8 is a view for describing a scanning optical system A and a scanning optical system B.

As illustrated in FIG. 8 as one example, the scanning optical system A is disposed at the −X side of the polygon mirror 2104, and includes a first scanning lens 2105A, three folding mirrors (2106a, 2106b, 2107b), and two second scanning lenses (2108a, 2108b).

The photoconductor drum K1 is irradiated with the light LBa deflected by the polygon mirror 2104 via the first scanning lens 2105A, the folding mirror 2106a, and the second scanning lens 2108a.

The photoconductor drum C1 is irradiated with the light LBb deflected by the polygon mirror 2104 via the first scanning lens 2105A, the folding mirror 2106b, the folding mirror 2107b, and the second scanning lens 2108b.

As illustrated in FIG. 8 as one example, the scanning optical system B is disposed at the +X side of the polygon mirror 2104, and includes a first scanning lens 2105B, three folding mirrors (2106c, 2106d, 2107c), and two second scanning lenses (2108c, 2108d).

The photoconductor drum M1 is irradiated with the light LBc deflected by the polygon mirror 2104 via the first scanning lens 2105B, the folding mirror 2106c, the folding mirror 2107c, and the second scanning lens 2108c.

The photoconductor drum Y1 is irradiated with the light LBd deflected by the polygon mirror 2104 via the first scanning lens 2105B, the folding mirror 2106d, and the second scanning lens 2108d.

The optical spot on each photoconductor drum moves in the longitudinal direction of each photoconductor drum, i.e., in the main scanning direction, with the rotation of the polygon mirror 2104.

Each of the first scanning lenses are the one having positive refractive power in the main-scanning corresponding direction (here, the Y axis direction), but not having refractive power in the sub-scanning corresponding direction (here, the Z axis direction).

In the present embodiment, the first scanning lens 2105A is shared by the light LBa and the light LBb. Similarly, the first scanning lens 2105B is shared by the light LBc and the light LBd. If the first scanning lens corresponding to the light LBa and the first scanning lens corresponding to the light LBb are used instead of the first scanning lens 2105A, these two first scanning lenses are disposed as superimposed in the sub-scanning corresponding direction (here, the Z axis direction). This needs to increase a space between the light LBa and the light LBb in the sub-scanning corresponding direction.

In the present embodiment, the first scanning lens is shared by two lights, whereby the space between these two lights in the sub-scanning corresponding direction can be decreased. In addition, the configuration in which the first scanning lens is shared by two lights can reduce a number of components, thereby being capable of reducing cost for the components, increasing efficiency in managing components, and reducing cost for component management.

The plurality of second scanning lenses (2108a, 2108b, 2108c, 2108d) has the same shape, and individually corresponds to each of the plurality of surfaces to be scanned (K1, C1, M1, Y1). Here, the second scanning lens 2108a corresponds to the photoconductor drum K1, the second scanning lens 2108b corresponds to the photoconductor drum C1, the second scanning lens 2108c corresponds to the photoconductor drum M1, and the second scanning lens 2108d corresponds to the photoconductor drum Y1. The second scanning lenses are those having positive refractive power in the sub-scanning corresponding direction.

One example of an equation representing the shape of the optical surface of the second scanning lens is shown in the following equation (1). In this equation, a paraxial curvature radius in a "main-scanning cross-section" that includes an optical axis and is a cross-section parallel to the main-scanning corresponding direction is defined as RY, a distance from the optical axis with respect to the main-scanning corresponding direction is defined as Y, high-order coefficients are defined as A, B, C, D, . . . , and a paraxial curvature radius in a sub-scanning cross-section orthogonal to the main-scanning cross-section is defined as RZ.

$$X(Y, Z) = \frac{Y^2 \cdot Cm}{1 + \sqrt{1 - (1 + K) \cdot (Y \cdot Cm)^2}} + \quad (1)$$
$$A \cdot Y^4 + B \cdot Y^6 + C \cdot Y^8 + \ldots + \frac{Cs(Y) \cdot Z^2}{1 + \sqrt{1 - (Cs(Y) \cdot Z)^2}}$$

Further, Cm is represented by the following equation (2), and Cs(Y) is represented by the following equation (3). Here, a, b, c, . . . are coefficients.

$$Cm = \frac{1}{RY} \quad (2)$$

$$Cs(Y) = \frac{1}{RZ} + a \cdot Y + b \cdot Y^2 + c \cdot Y^3 + d \cdot Y^4 + \ldots \quad (3)$$

Figure 9:
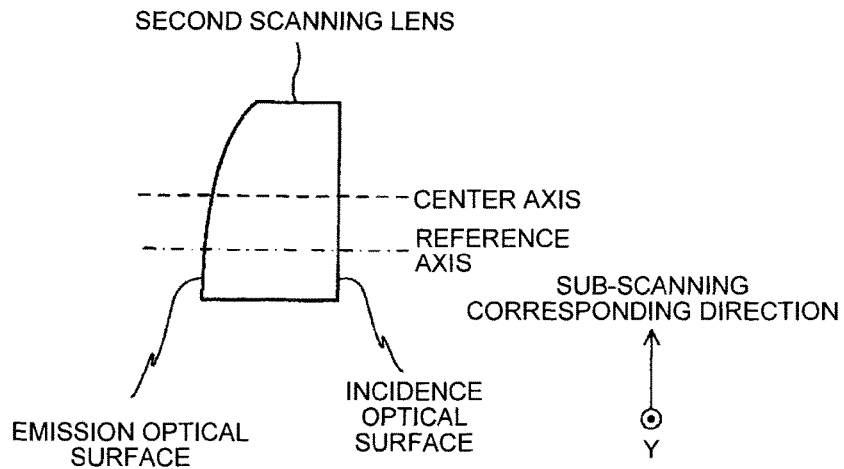
FIG. 9 is a view for describing a reference axis and a center axis of a second scanning lens.

Here, a virtual line linking an origin in the equation representing the shape of the optical surface of the second scanning lens at the incidence side and an origin in the equation representing the shape of the optical surface at the emission side is referred to as a reference axis. In the description below, the optical surface at the incidence side is abbreviated to an "incidence optical surface", and the optical surface at the emission side is abbreviated to an "emission optical surface". Further, the virtual line parallel to the reference axis and passing through the center of the second scanning lens is referred to as a center axis. As illustrated in FIG. 9 as one example, the reference axis and the center axis are shifted in the sub-scanning corresponding direction.

Here, the shape of the emission optical surface of the second scanning lens with respect to the sub-scanning corresponding direction is asymmetric about the center axis, and the shape in the sub-scanning corresponding direction is asymmetric about the reference axis with respect to the main-scanning corresponding direction, for correcting a field curvature or for making the magnification in the sub-scanning corresponding direction constant with respect to the main-scanning corresponding direction to correct a scanning line curvature. For convenience, the optical surface with such a shape is referred to as a "main-sub asymmetric optical surface" below.

The emission optical surface of the second scanning lens has an odd-order term in the above equation (3). Notably, at least either one of the incidence optical surface and the emission optical surface may have the above main-sub asymmetric optical surface.

Figure 10:
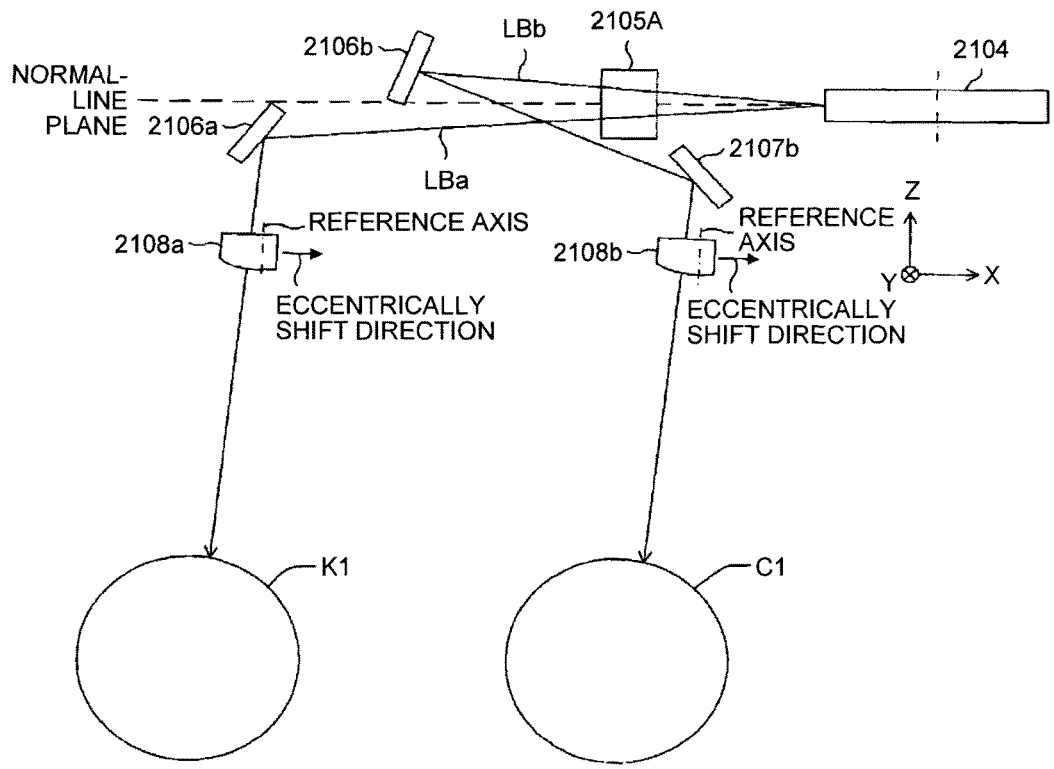
FIG. 10 is a view for describing the detail of the scanning optical system A.
Figure 11:
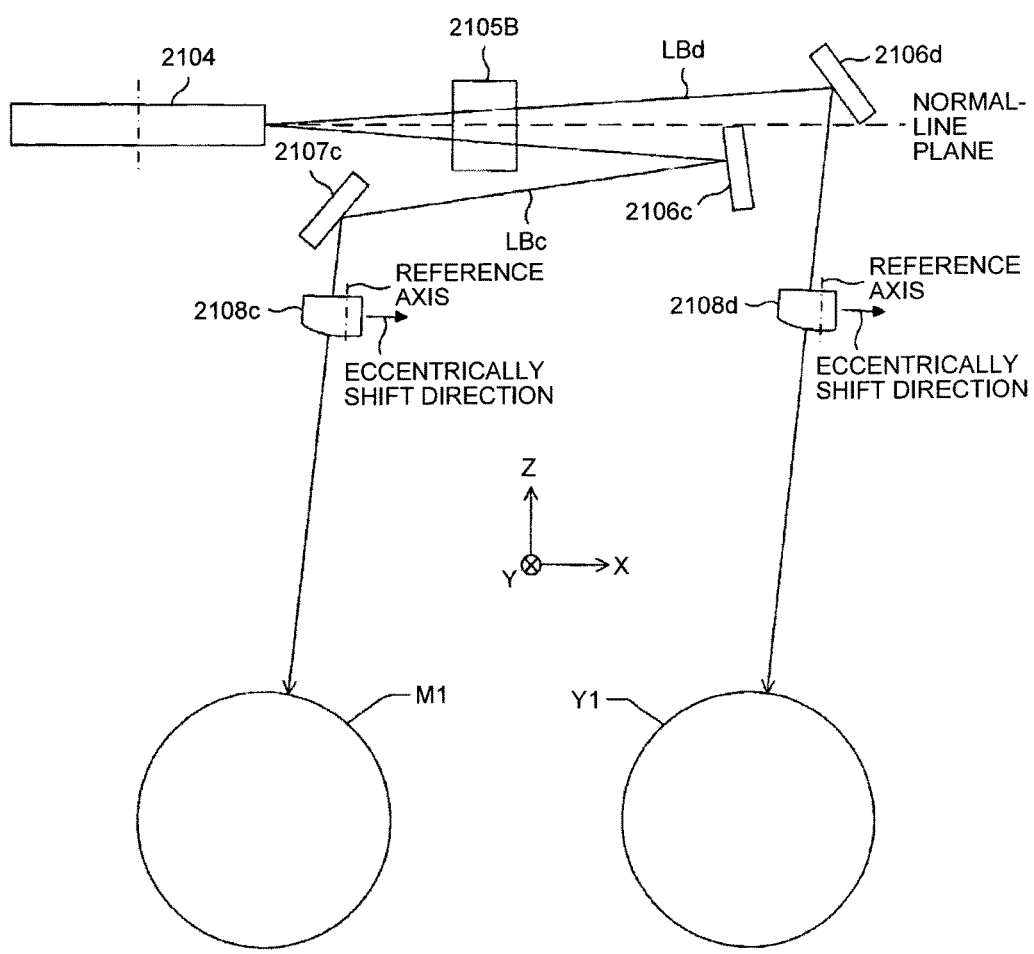
FIG. 11 is a view for describing the detail of the scanning optical system B.

The second scanning lens is also disposed as eccentrically shifted in the sub-scanning corresponding direction for reducing an occurrence of a scanning line curvature caused by the oblique incidence and deterioration in wave aberration (see FIGS. 10 and 11).

Figure 12:
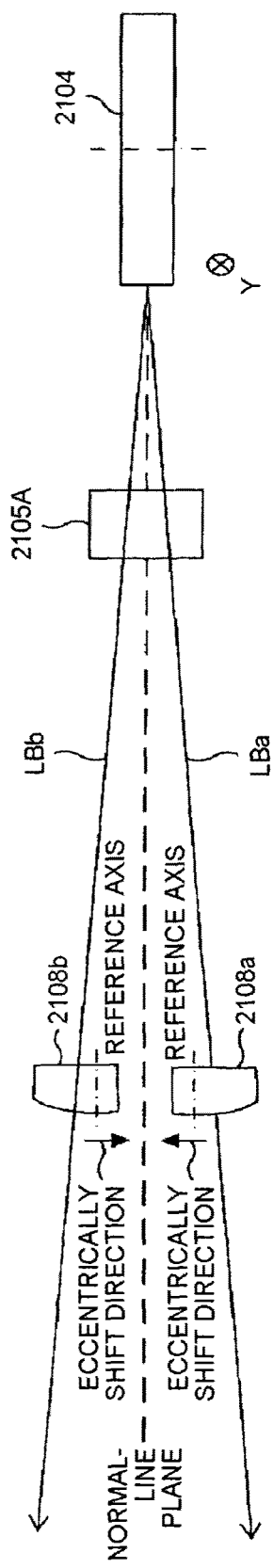
FIG. 12 is a developed view of the scanning optical system A.
Figure 13:
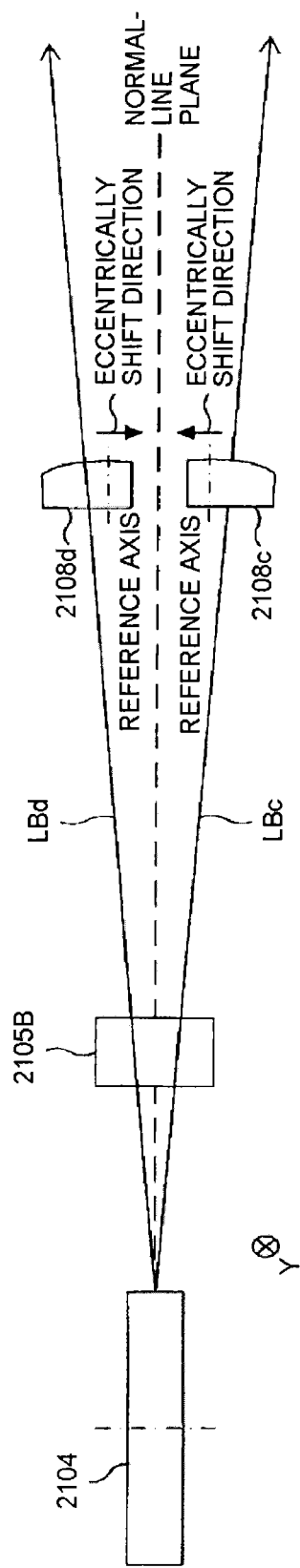
FIG. 13 is a developed view of the scanning optical system B.

Notably, the second scanning lens is disposed such that, when the folding mirrors are removed, and the optical scanning system is developed such that an optical path becomes a single straight line, the reference axis of the second scanning lens and the optical axis of the first scanning lens are parallel to each other, as illustrated in FIGS. 12 and 13. In this case, the eccentrically shifting direction of the second scanning lens is the direction close to the normal-line plane.

Since the second scanning lens is eccentrically shifted in the sub-scanning corresponding direction, light does not pass through the reference axis of the second scanning lens but passes through only one side with respect to the reference axis in the sub-scanning corresponding direction.

Figure 14:
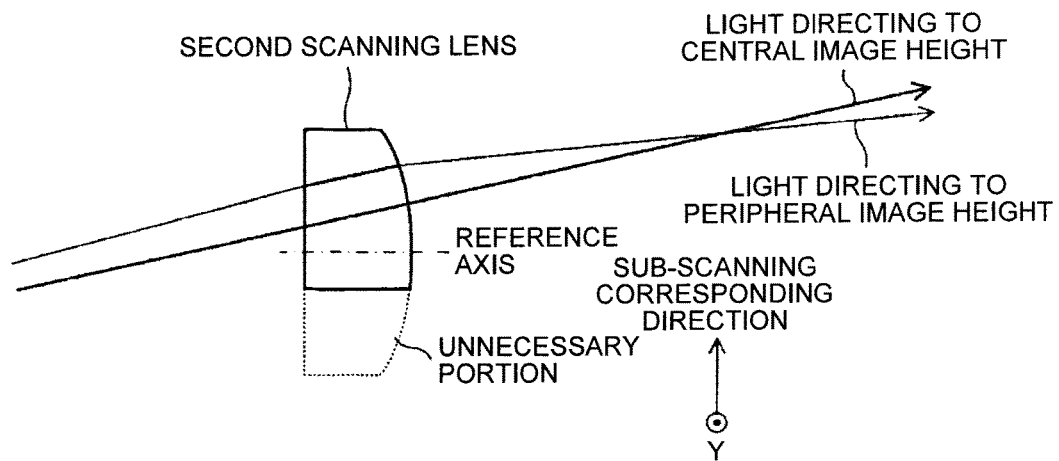
FIG. 14 is a view for describing light passing through the second scanning lens.

In view of this, as illustrated in FIG. 14 as one example, an unnecessary portion through which light does not pass is cut. As a result, the shape of the second scanning lens in the sub-scanning corresponding direction becomes asymmetric about the reference axis. With this configuration, the second scanning lens can be made compact and low-cost, as well as the dimension of the optical scanning device in the Z axis direction can be decreased. It is to be noted that light generally passes through the portion near the reference axis in the horizontal incidence system. Also, the shape of the conventional second scanning lens in the sub-scanning corresponding direction is symmetric about the reference axis.

Figure 15:
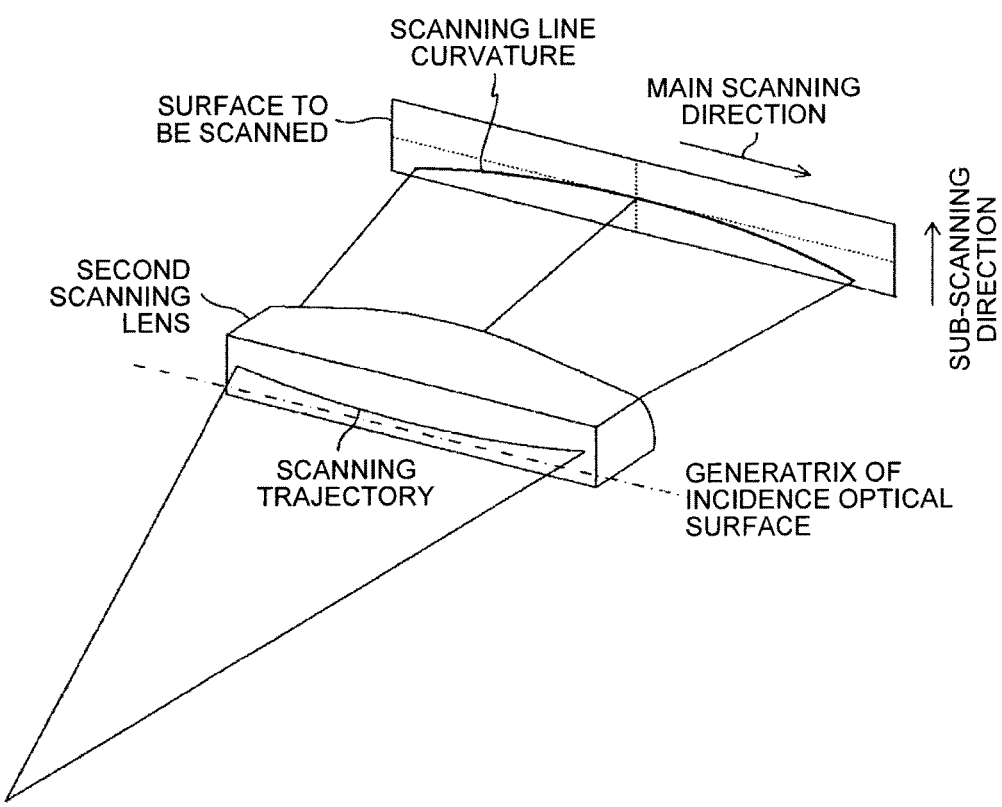
FIG. 15 is a view for describing a relationship between light incident on the second scanning lens and a scanning line curvature on a surface to be scanned.

FIG. 15 schematically illustrates the state in which light is incident on the second scanning lens. The scanning trajectory is shifted in the sub-scanning corresponding direction relative to the generatrix.

Figure 16:
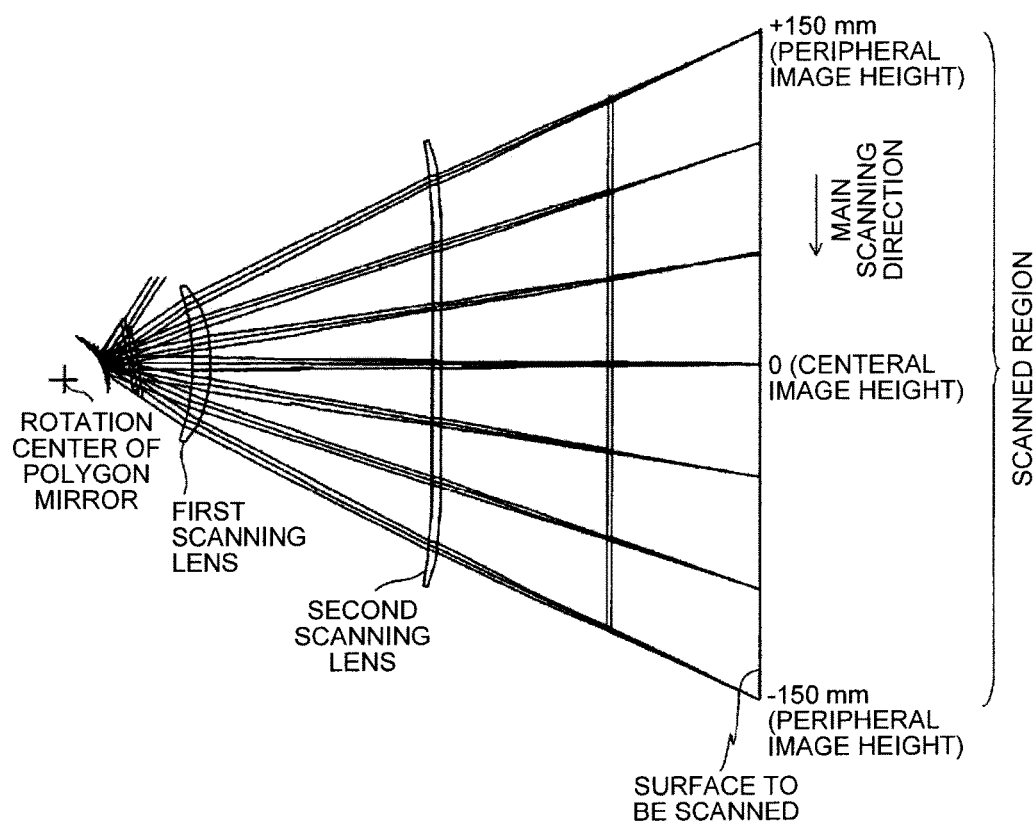
FIG. 16 is a view for describing a central image height and a peripheral image height.

As illustrated in FIG. 16 as one example, the center of the scanned region in the main scanning direction is called a central image height, and the end thereof is called a peripheral image height. Here, when the central image height is defined as an origin in the main scanning direction, the peripheral image height at one side is −150 mm, and the peripheral image height at the other side is +150 mm.

Figure 17:
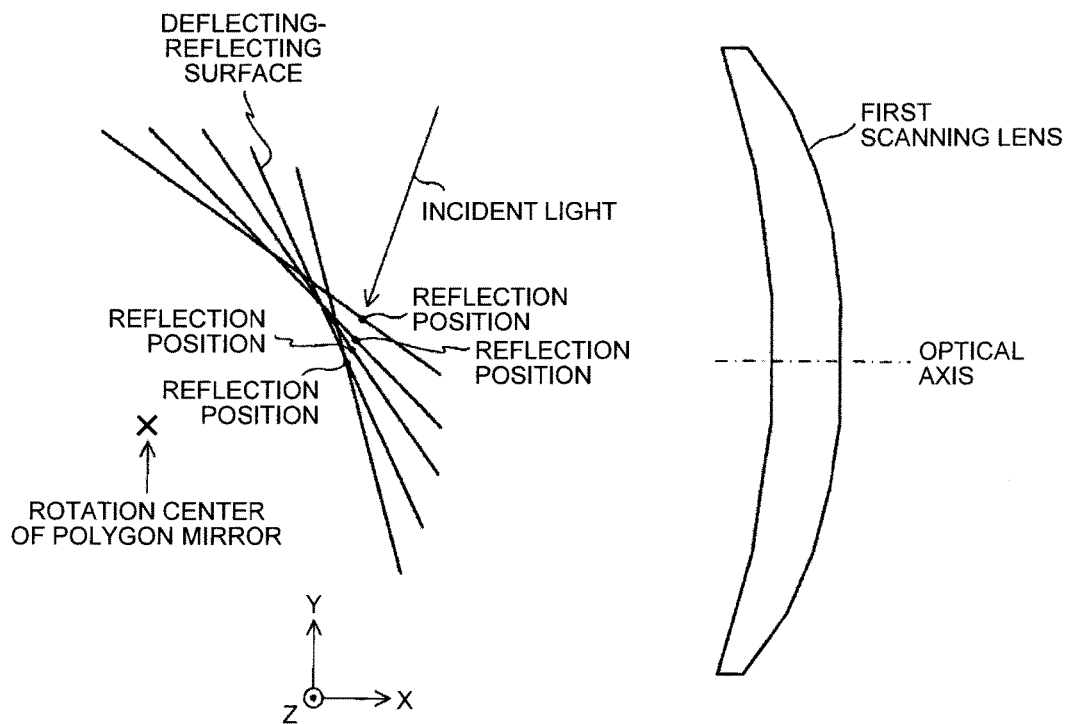
FIG. 17 is a view for describing sag asymmetry.
Figure 18:
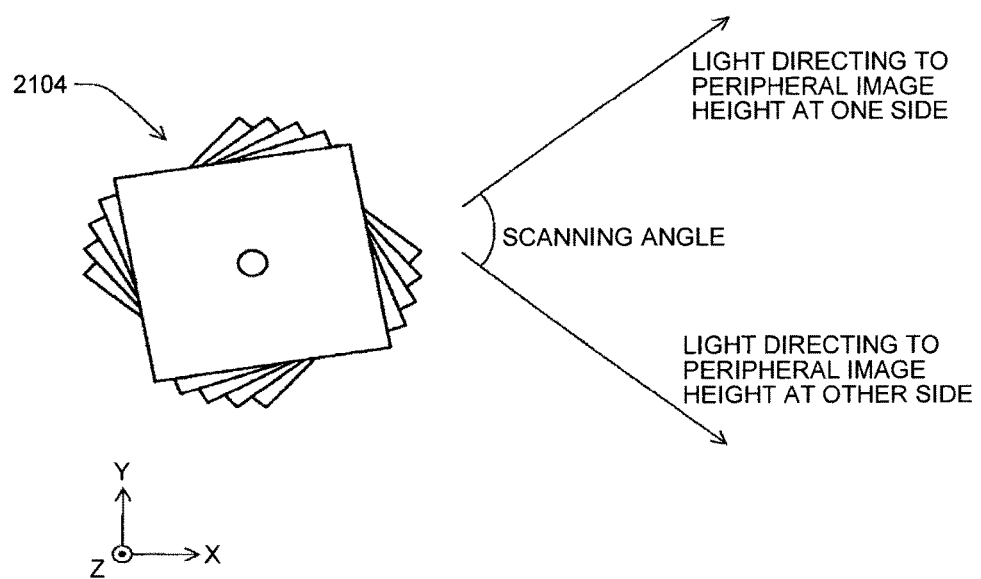
FIG. 18 is a view for describing a scanning angle.

As illustrated in FIG. 17 as one example, a reflection position of light on the deflecting-reflecting surface with respect to the X axis direction is changed with the rotation of the polygon mirror 2104. It is well known that this change is caused because the deflecting-reflecting surface is at the position apart from the rotation center of the polygon mirror 2104, and the amount of change in the reflection position does not become symmetric about the optical axis of the first scanning lens, unless light is incident on the polygon mirror 2104 from the direction of the central image height with respect to the Y axis direction. Notably, the situation in which the amount of change of the reflection position in the X axis direction becomes asymmetric about the optical axis of the first scanning lens is also referred to as "sag asymmetry" below.

In this case, in a plane tilt correction optical system in which a deflecting-reflecting surface and a surface to be scanned have a conjugate relation, a position of an object point in the sub-scanning corresponding direction also asymmetrically changes due to the sag asymmetry involved with the rotation of the polygon mirror 2104. Therefore, a field curvature on the surface to be scanned in the sub-scanning corresponding direction occurs in an asymmetric manner between a plus image height region and a minus image height region. Notably, the field curvature in the sub-scanning direction is abbreviated to "sub-scanning field curvature" below for convenience.

The sag asymmetry involved with the rotation of the polygon mirror 2104 becomes a hindrance for the situation in which the magnification in the sub-scanning corresponding direction is made uniform with respect to the main scanning direction. Notably, the magnification in the sub-scanning corresponding direction is abbreviated to "sub-scanning magnification" below for convenience.

The effect obtained by the configuration in which the second scanning lens has a surface of which shape in the sub-scanning corresponding direction is asymmetric about the reference axis with respect to the main-scanning corresponding direction is much advantageous for suppressing the asymmetry of the sub-scanning field curvature and the hindrance of the sub-scanning magnification and enhancing optical performance of the scanning optical system.

Even if the scanning optical system is a wide angle scanning optical system with a scanning angle (see FIG. 18) exceeding 80 degrees, deterioration in the optical characteristics caused by the sag asymmetry can be suppressed with the second scanning lens included in this system.

The scanning line curvature will be described here.

For example, in a scanning lens included in a scanning optical system, especially in a scanning lens (the second scanning lens in the present embodiment) having high refractive power in the sub-scanning corresponding direction, the distance from the deflecting-reflecting surface to the incidence optical surface differs due to a height of the lens in the main-scanning corresponding direction, unless the shape of the incidence optical surface in the main-scanning corresponding direction is arc with the reflection position of light on the deflecting-reflecting surface defined as a center. Notably, the scanning lens having high refractive power in the sub-scanning corresponding direction is merely referred to as a "scanning lens" below for avoiding complexity.

It is difficult to form the scanning lens into the arc shape in consideration of maintaining the optical performance. Specifically, except for light directing to the central image height O, light is incident on the scanning lens from the direction inclined relative to the direction orthogonal to the incidence optical surface, upon an orthographic projection on the XY plane.

In the oblique incidence system, the distance of the light incident on the scanning lens from the deflecting-reflecting surface to the incidence optical surface of the scanning lens differs depending on the incidence position in the main-scanning corresponding direction. The light incidence position on the scanning lens is higher or lower at the position closer to the end than the center in the main-scanning corresponding direction. Whether the incidence position becomes higher or lower depends on the oblique incidence direction.

Consequently, when passing through the optical surface having refractive power in the sub-scanning corresponding direction, the light incident on the scanning lens receives different refractive power according to the incidence position in the main-scanning corresponding direction, resulting in that a scanning line curvature occurs on the surface to be scanned. Specifically, the curvature of the scanning trajectory on the scanning lens causes the scanning line curvature on the surface to be scanned.

When an oblique incidence system is used in an optical scanning device having a conventional scanning optical system, light passes through a scanning lens having refractive power in the sub-scanning corresponding direction, resulting in that a large scanning line curvature occurs.

In the horizontal incidence system, light moves horizontally to a scanning lens even if a distance from a deflecting-reflecting surface to an incidence optical surface of the scanning lens differs. Therefore, the incidence position on the scanning lens with respect to the sub-scanning corresponding direction does not vary, so that a scanning line curvature does not occur on a surface to be scanned.

Further, a curvature direction of the scanning line curvature due to the oblique incidence system differs depending on a light oblique incidence direction. Specifically, the curvature direction of the scanning line curvature is opposite to each other between light introduced from the +Z side of the normal-line plane and light introduced from the −Z side. This is because the direction of the curvature of the scanning trajectory on the scanning lens is different depending on the light oblique incidence direction.

The change in the scanning line curvature caused by a temperature change will next be described.

Recently, a resin material is popularly used for a material of a scanning lens due to reduction in cost and improvement in image quality. The resin material is advantageous such that it can provide higher degree of freedom than a glass upon designing a lens shape and it can easily implement a complex shape such as an aspherical shape. However, a change in shape of the resin material due to a temperature change is larger than that of a glass.

In the oblique incidence system, the scanning trajectory of light incident on the scanning lens is curved in the sub-scanning corresponding direction. Therefore, when (1) the curvature radius or thickness of the scanning lens is changed, (2) an incidence angle of light incident on the scanning lens is changed, or (3) the incidence position in the sub-scanning corresponding direction is changed, due to a temperature change, an influence to light refraction differs depending on the incidence position in the main-scanning corresponding direction, and hence, a change in the scanning line curvature occurs.

In the horizontal incidence system, light passes through a generatrix on a scanning lens. Therefore, even when a curvature radius is changed due to a temperature change, light refraction in the sub-scanning corresponding direction does not occur, or is very small, although a focusing position (defocus direction) is changed. Specifically, in the horizontal incidence system, the change in the scanning line curvature due to the temperature change is very small.

The change in the scanning line curvature caused by the temperature change differs depending on the oblique incidence direction of light. Specifically, the direction in which the scanning line curvature is changed is opposite between light incident from the +Z side of the normal-line plane and light incident from −Z side.

With this, when the directions of the scanning line curvatures are different among different surfaces to be scanned, a color shift occurs upon superimposition of toner images, which significantly deteriorates quality of a color image.

In view of this, in the present embodiment, the number of the folding mirrors disposed between the corresponding photoconductor drum and the polygon mirror 2104 is set different between two lights reflected on the same deflecting-reflecting surface, one of which is light incident from one side with respect to the normal-line plane and the other of which is light incident from the other side with respect to the normal-line plane. Specifically, if the number of the folding mirrors for one light is an even number, the number of the folding mirrors for the other light is an odd number.

Here, the arrangement of the folding mirrors will specifically be described.

The light LBa and the light LBb are obliquely incident on the same deflecting-reflecting surface. The light LBa is incident on the deflecting-reflecting surface from the +Z side with respect to the normal-line plane, while the light LBb is incident on the deflecting-reflecting surface from the −Z side with respect to the normal-line plane. For the light LBa, the number of the folding mirrors disposed between the photoconductor drum K1 that is the corresponding photoconductor drum and the polygon mirror 2104 is one (odd number), while for the light LBb, the number of the folding mirrors disposed between the photoconductor drum C1 that is the corresponding photoconductor drum and the polygon mirror 2104 is two (even number).

The shape of the scanning line curvature caused by the oblique incidence system is inverted between light incident from one side with respect to the normal-line plane and light incident from the other side with respect to the normal-line plane. This is because the direction of the curvature of the scanning trajectory on the second scanning lens is opposite between the light incident from one side with respect to the normal-line plane and the light incident from the other side with respect to the normal-line plane. If the folding mirror is not disposed, the direction of the scanning line curvature is opposite between the surface to be scanned with the light incident from one side with respect to the normal-line plane and the surface to be scanned with the light incident from the other side with respect to the normal-line plane, resulting in that a color shift upon superimposition of toner images is large. The same can apply to the change in the scanning line curvature caused by the temperature change.

When light is folded by the folding mirror, the shape of the scanning trajectory is inverted with respect to the sub-scanning corresponding direction. In view of this, the numbers of the folding mirrors disposed between the corresponding photoconductor drum and the polygon mirror 2104 for the light LBa and the light LBb are set such that, if one of the numbers is even, the other one is odd. This can allow the directions of the scanning line curvatures on the photoconductor drum K1 and the photoconductor drum C1 to be the same.

Similarly, the numbers of the folding mirrors disposed between the corresponding photoconductor drum and the polygon mirror 2104 for the light LBc and the light LBd are set such that, if one of the numbers is even, the other one is odd. This can allow the directions of the scanning line curvatures on the photoconductor drum M1 and the photoconductor drum Y1 to be the same.

Meanwhile, the second scanning lens has an asymmetric shape relative to the center axis with respect to the sub-scanning corresponding direction. Therefore, when the direction of the second scanning lens with respect to the sub-scanning corresponding direction is determined, the direction of the second scanning lens with respect to the main-scanning corresponding direction is also determined. With this, even if the direction of the scanning line curvature is aligned by the configuration of the folding mirror, the directions of the plurality of second scanning lenses with respect to the main-scanning corresponding direction might be opposite to one another depending on the arrangement position of the second scanning lenses. It is to be noted that the direction of the second scanning lens indicates a direction to light.

FIG. 19 illustrates a comparative example of the scanning optical system B. In this comparative example, the direction with respect to the main-scanning corresponding direction is opposite between the second scanning lens corresponding to the light LBc and the second scanning lens corresponding to the light LBd as illustrated in FIGS. 20A and 20B.

This case cannot provide the effect obtained by the configuration in which, with respect to the main-scanning corresponding direction, the shape of at least one optical surface of the second scanning lens in the sub-scanning corresponding direction is formed asymmetric about the reference axis. Specifically, the sag asymmetry and the above asymmetry of the optical surface for correcting the sag asymmetry do not match, and on the contrary, the above asymmetry deteriorates optical characteristics.

If the shape of the optical surface of the second scanning lens in the sub-scanning corresponding direction is symmetric about the reference axis with respect to the main-scanning corresponding direction, the second scanning lens can be disposed without being inverted with respect to the main-scanning corresponding direction by the arrangement in which one side and the other side with respect to the reference axis in the sub-scanning corresponding direction are appropriately used. However, in this case, the second scanning lens needs a size in the sub-scanning corresponding direction to be about two times the size of the region where light passes, and this causes many problems such as an increase in size and cost of the optical scanning device. In view of this, in the present embodiment, the shape of the optical surface (here, the emission optical surface) of the second scanning lens with respect to the sub-scanning corresponding direction is asymmetric about the center axis.

The present embodiment is configured such that the difference in the number of the folding mirrors disposed between the corresponding second scanning lens and the polygon mirror 2104 between two lights reflected on the same deflecting-reflecting surface, one of which is incident from one side with respect to the normal-line plane and the other one of which is incident from the other side with respect to the normal-line plane, becomes an odd number, in order to attain satisfactory optical characteristics even though the second scanning lens has the main-sub asymmetric optical surface.

In this case, as illustrated in FIGS. 21, 22A, and 22B, the plurality of second scanning lenses can be disposed without making the directions with respect to the main-scanning corresponding direction and the directions with respect to the sub-scanning corresponding direction different, even if the second scanning lens has the main-sub asymmetric optical surface.

Next, the number of the folding mirrors disposed between the corresponding photoconductor drum and the polygon mirror 2104 for a plurality of lights obliquely incident on different deflecting-reflecting surfaces will be described.

In the present embodiment, when the number of the folding mirrors disposed for light incident from one side with respect to the normal-line plane is odd, the number of the folding mirrors disposed for light that is obliquely incident on the deflecting-reflecting surface different from this light and that is incident from the other side with respect to the normal-line plane is also odd.

Specifically, the number of the folding mirrors disposed for the light LBa is one (odd), and the number of the folding mirrors disposed for the light LBd is also one (odd).

When the number of the folding mirrors disposed for light incident from one side with respect to the normal-line plane is even, the number of the folding mirrors disposed for light that is obliquely incident on the deflecting-reflecting surface different from this light and that is incident from the other side with respect to the normal-line plane is also even.

Specifically, the number of the folding mirrors disposed for the light LBc is two (even), and the number of the folding mirrors disposed for the light LBb is also two (even).

When the number of the folding mirrors disposed for light incident from one side with respect to the normal-line plane is odd, the number of the folding mirrors disposed for light that is obliquely incident on the deflecting-reflecting surface different from this light and that is incident from one side with respect to the normal-line plane is even.

Specifically, the number of the folding mirrors disposed for the light LBa is one (odd), and the number of the folding mirrors disposed for the light LBc is two (even).

When the number of the folding mirrors disposed for light incident from the other side with respect to the normal-line plane is even, the number of the folding mirrors disposed for light that is obliquely incident on the deflecting-reflecting surface different from this light and that is incident from the other side with respect to the normal-line plane is odd.

Specifically, the number of the folding mirrors disposed for the light LBb is two (even), and the number of the folding mirrors disposed for the light LBd is one (odd).

Figure 23:
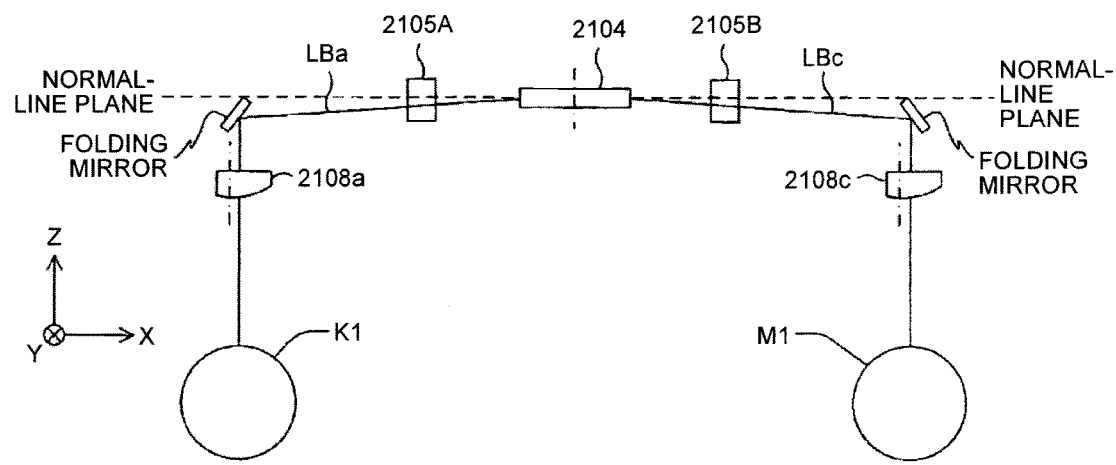
FIG. 23 is a view for describing a comparative example of a duplex scanning system.
Figure 24A:
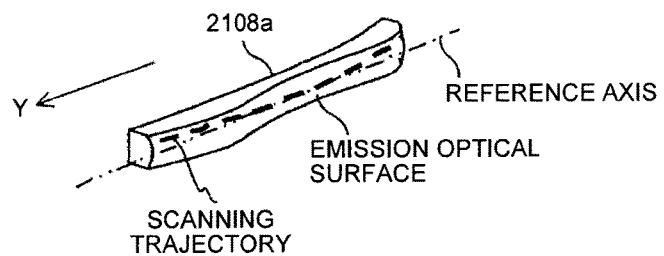
FIGS. 24A and 24B each are views for describing a scanning trajectory in the comparative example of the duplex scanning system.
Figure 24B:
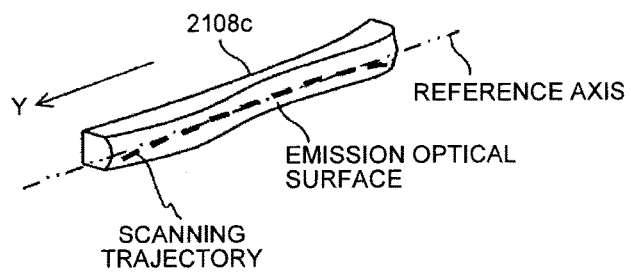
Figure 25:
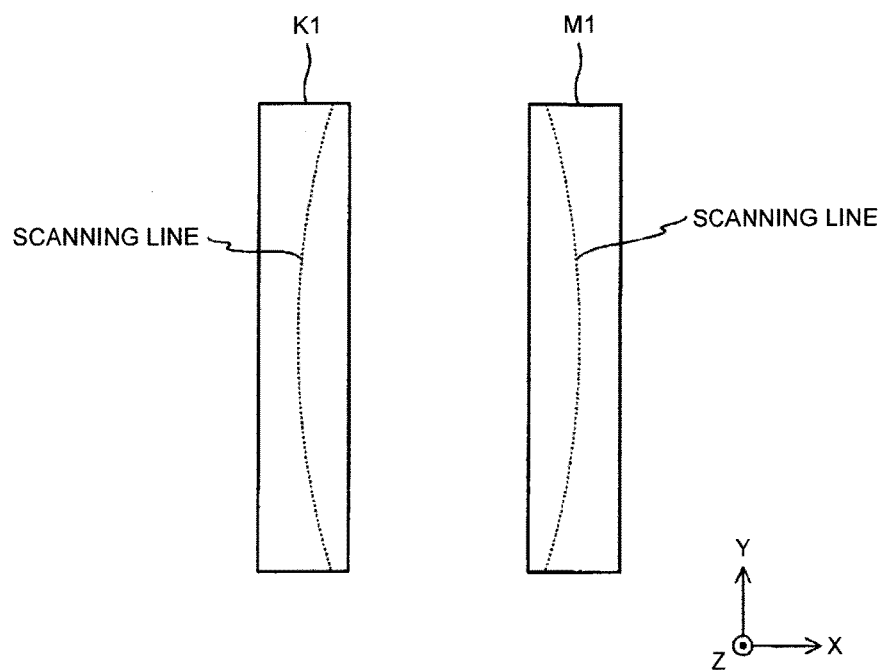
FIG. 25 is a view for describing a scanning line curvature on each photoconductor drum in the comparative example of the duplex scanning system.
Figure 26:
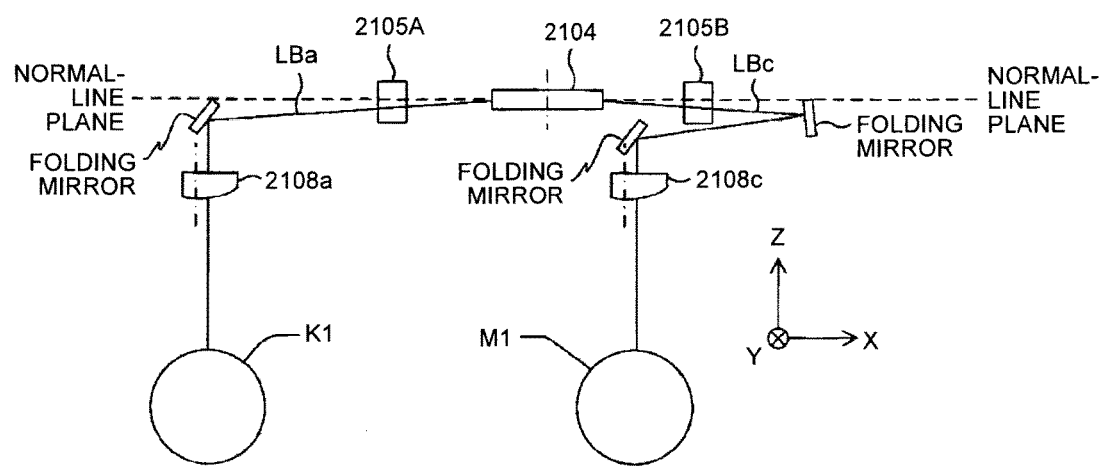
FIG. 26 is a view for describing an embodiment of the duplex scanning system.
Figure 27A:
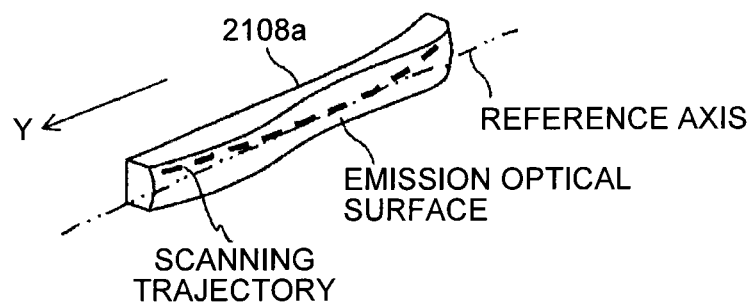
FIGS. 27A and 27B each are views for describing a scanning trajectory in the embodiment of the duplex scanning system.
Figure 27B:
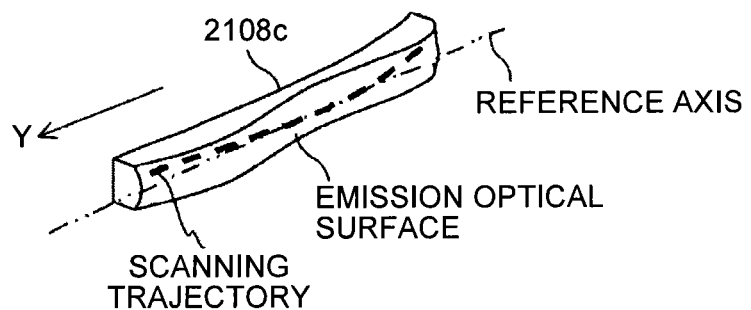
Figure 28:
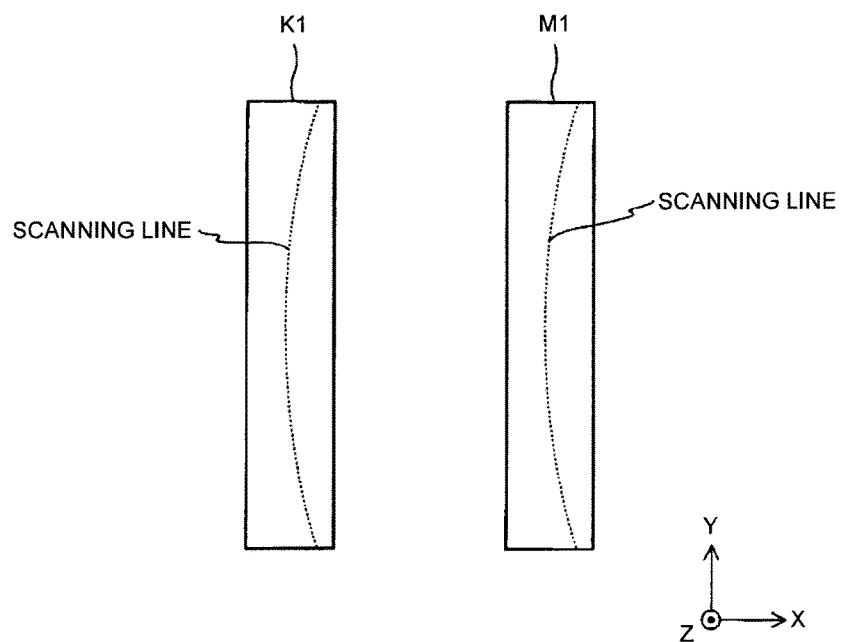
FIG. 28 is a view for describing a scanning line curvature on each photoconductor drum in the embodiment of the duplex scanning system.

Meanwhile, in a duplex optical scanning system, if the number of the folding mirrors disposed between the corresponding second scanning lens and the polygon mirror 2104 is the same (one in FIG. 23) for the light LBa and the light LBc, these two lights being reflected on different deflecting-reflecting surfaces as illustrated in FIG. 23, for example, the directions of the curvatures of the scanning trajectories on the second scanning lens 2108a and the second scanning lens 2108c are opposite to each other as illustrated in FIGS. 24A and 24B as one example. The directions of the scanning line curvatures on the photoconductor drum K1 and the photoconductor drum M1 are also opposite to each other as illustrated in FIG. 25 as one example.

This is considered that the similar scanning line curvature occurs, because the oblique incidence direction is the same between the light LBa and the light LBc. However, the advancing directions of the light LBa and the light LBc after these lights are reflected on the corresponding deflecting-reflecting surface are different from each other, so that the shape of the scanning line curvature becomes opposite to each other on the photoconductor drums.

In view of this, in the duplex optical scanning system, the number of the folding mirrors disposed between the corresponding photoconductor drum and the polygon mirror 2104 for two lights having the same oblique incidence direction and reflected on the different deflecting-reflecting surfaces is set such that, if one of the numbers is even, the other one is odd. This can allow the directions of the scanning line curvatures on two photoconductor drums to be the same (see FIGS. 26 to 28).

As stated above, the scanning line curvature occurs due to light passing through a lens (the second scanning lens in the present embodiment) with refractive power in the sub-scanning corresponding direction. However, the direction of the scanning line curvature is determined by the number of the folding mirrors, regardless of the direction of the curvature of the scanning trajectory.

Here, the case in which two lights having the same oblique incidence direction and reflected on different deflecting-reflecting surfaces are the light LBa and the light LBc has been described. However, the same applies to the case in which these two lights are the light LBb and the light LBd.

In order to attain satisfactory optical characteristics by using the second scanning lens having the main-sub asymmetric optical surface, the difference in the number of folding mirrors disposed between the corresponding second scanning lens and the polygon mirror 2104 between two lights deflected on the same deflecting-reflecting surface and having different oblique incidence direction is set to be an odd number.

In addition, the difference in the number of the folding mirrors disposed between the corresponding second scanning lens and the polygon mirror 2104 between two lights having the same oblique incidence direction and reflected on the different deflecting-reflecting surfaces is set to be an odd number.

With this, the arrangement direction of even the second scanning lenses having the main-sub asymmetric optical surface can be aligned. Here, when the second scanning lenses are arranged such that the directions with respect to the sub-scanning corresponding direction become the directions illustrated in FIGS. 12 and 13, the directions of the plurality of second scanning lenses with respect to the main-scanning corresponding direction can be aligned, and this can provide the effect obtained by the optical surface of which shape in the sub-scanning corresponding direction is asymmetric about the reference axis with respect to the main-scanning corresponding direction. Accordingly, the four second scanning lenses can be formed to have the same shape.

With $|\theta a|=|\theta b|=|\theta c|=|\theta d|$, the degree of the scanning line curvature caused by the oblique incidence system can be made almost the same for all photoconductor drums. Further, the appropriate number of the folding mirrors can significantly reduce a color shift. In addition, the amount of change of the scanning line curvature caused by the temperature change becomes almost the same for all photoconductor drums, whereby a high-quality image with a small color shift can stably be formed, even when a temperature change occurs.

In view of this, when the number of the folding mirrors disposed between the corresponding photoconductor drum and the polygon mirror 2104 for the light LBa is odd, the number of the folding mirrors disposed between the corresponding photoconductor drum and the polygon mirror 2104 for the light LBb and the light LBc is set to be even, and the number of the folding mirrors disposed between the corresponding photoconductor drum and the polygon mirror 2104 for the light LBd is set to be odd as in the present embodiment. This configuration can allow the directions of the scanning line curvatures on four photoconductor drums to be the same. Consequently, a color shift upon the superimposition of toner images can be reduced.

Notably, it may be configured such that the number of the folding mirrors disposed between the corresponding photoconductor drum and the polygon mirror 2104 for the light LBa and the light LBd is set to be even, and the number of the folding mirrors disposed between the corresponding photoconductor drum and the polygon mirror 2104 for the light LBb and the light LBc is set to be odd. This configuration can also allow the directions of the scanning line curvatures on four photoconductor drums to be the same.

As described above, the optical scanning device 2010 according to the present embodiment includes the four light sources (2200a, 2200b, 2200c, 2200d), the pre-deflector optical system A, the pre-deflector optical system B, the polygon mirror 2104, the scanning optical system A, the scanning optical system B, and the like.

Each of the four light sources corresponds to each of the four photoconductor drums, and light from each light source is obliquely incident on the polygon mirror 2104. Each of the scanning optical systems includes the first scanning lens, a plurality of folding mirrors, and four second scanning lenses. Each of the four second scanning lenses has the same shape, and corresponds to each of the four photoconductor drums. In each of the second scanning lenses, at least one of the incidence optical surface and the emission optical surface has an asymmetric shape about the center axis with respect to the sub-scanning corresponding direction, and has a shape in the sub-scanning corresponding direction to be asymmetric about the reference axis with respect to the main-scanning corresponding direction.

Further, the difference in the number of the folding mirrors disposed between the corresponding second scanning lens and the polygon mirror 2104 between two lights that are reflected on the same deflecting-reflecting surface and have different oblique incidence direction is set to be an odd number.

This can reduce a field curvature and a scanning line curvature as well as reduce a color shift caused by a temperature change or a processing error, while keeping miniaturization.

The color printer 2000 according to the present embodiment includes the optical scanning device 2010, whereby miniaturization and improvement in image quality can both be attained.

The above embodiment describes the case in which the optical scanning device 2010 is an optical scanning device with a duplex scanning system. However, the embodiment is not limited thereto. An optical scanning device with a simplex scanning system may also be applied.

Figure 29:
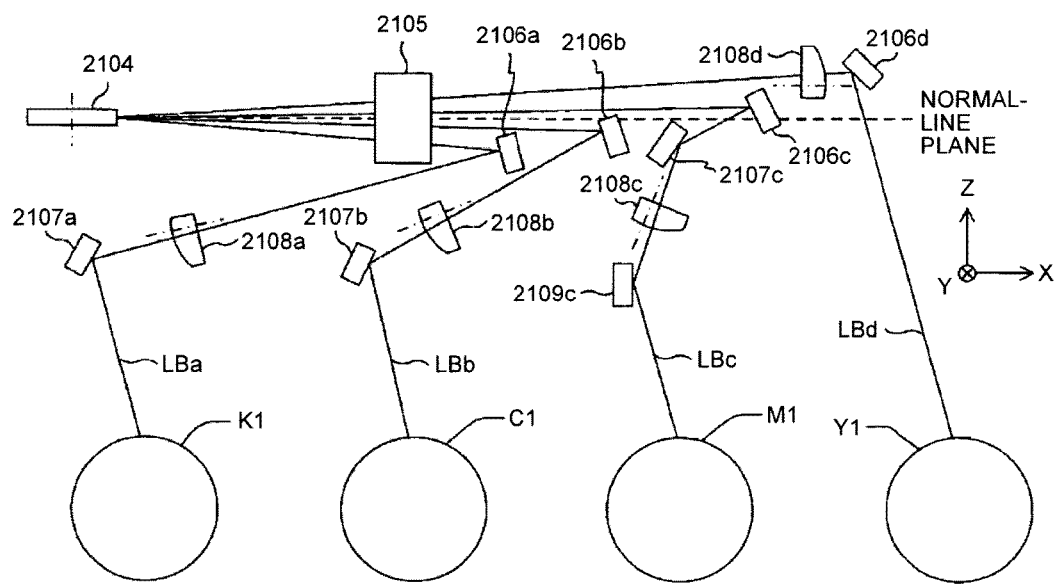
FIG. 29 is a view (1) for describing an embodiment of a simplex scanning system.
Figure 30:
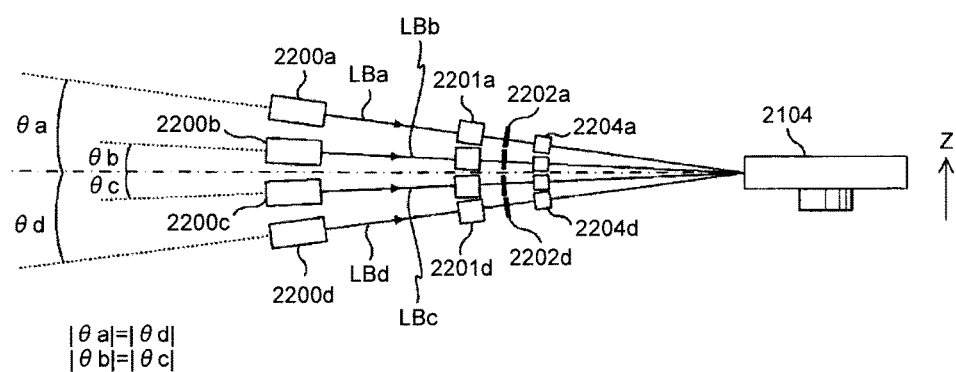
FIG. 30 is a view (2) for describing an embodiment of a simplex scanning system.

FIGS. 29 and 30 illustrate one example of an optical scanning device with a simplex scanning system. Here, different points from the above embodiment will mainly be described. The components same as or equivalent to the components in the above embodiment are identified by the same reference numerals, and their description will be simplified or omitted. A reference numeral 2109c in FIG. 29 is a folding mirror, and a reference numeral 2105 is a first scanning lens.

Here, the oblique incidence direction is the same between the light LBa and the light LBb. Further, the oblique incidence direction is the same between the light LBc and the light LBd.

$|\theta a|=|\theta d|$ and $|\theta b|=|\theta c|$ are established. This case means that the light LBa and the light LBd make a pair, and the light LBb and the light LBc make a pair. Also, the pair of the light LBa and the light LBd is referred to as an outer pair, while the pair of the light LBb and the light LBc is referred to as an inner pair.

In this optical scanning device, the difference in the number of the folding mirrors disposed between the corresponding second scanning lens and the polygon mirror 2104 between two lights (here, the light LBa and the light LBb, and the light LBc and the light LBd) having the same oblique incidence direction is zero or an even number.

In addition, the difference in the number of the folding mirrors disposed between the corresponding second scanning lens and the polygon mirror 2104 between the light pairs (here, the light LBa and the light LBd, and the light LBb and the light LBc) is an odd number.

With this configuration, the optical scanning device with a simplex scanning system can provide the effect similar to the above embodiment.

When a light pair is increased, the difference in the number of the folding mirrors disposed between the corresponding second scanning lens and the polygon mirror 2104 among a plurality of lights having the same oblique incidence direction is set to be zero or an even number. With this configuration, even if a second scanning lens having the main-sub asymmetric optical surface is used, a plurality of second scanning lenses can be disposed with the same direction with respect to the main-scanning corresponding direction and the sub-scanning corresponding direction, whereby an optical scanning device having a small color shift and excellent optical characteristics can be provided.

Meanwhile, the more the oblique incidence angle increases, the more the curvature of the scanning trajectory increases, and hence, the degree of the scanning line curvature on the surface to be scanned is increased. Specifically, in the optical scanning device with the simplex scanning system, the degree of the scanning line curvature for the outer pair (the light LBa and the light LBd) is larger than that for the inner pair (the light LBb and the light LBc). Further, the amount of change of the scanning line curvature for the outer pair due to the temperature change becomes larger. However, the directions of the scanning line curvatures can be aligned in this embodiment, whereby the color shift can be suppressed to be small.

When the oblique incidence angle is increased, various types of aberrations are increased, which deteriorates optical performance. Specifically, a beam-spot diameter increases due to an increase in wave aberration, and the scanning line curvature increases. For this reason, it is preferable that the oblique incidence angle is set as small as possible from the viewpoint of enhancement in optical performance and miniaturization of the optical scanning device.

However, smaller oblique incidence angle makes it difficult to cause each of a plurality of lights reflected on the same deflecting-reflecting surface to be split. Especially, a space between two lights has to be increased in a folding mirror which is disposed for folding light deflected by a polygon mirror and is disposed such that light directing to a different surface to be scanned passes through the side opposite to the advancing direction of the folded light. Increasing the space between two lights also increases the oblique incidence angle, which is non-preferable.

Figure 31:
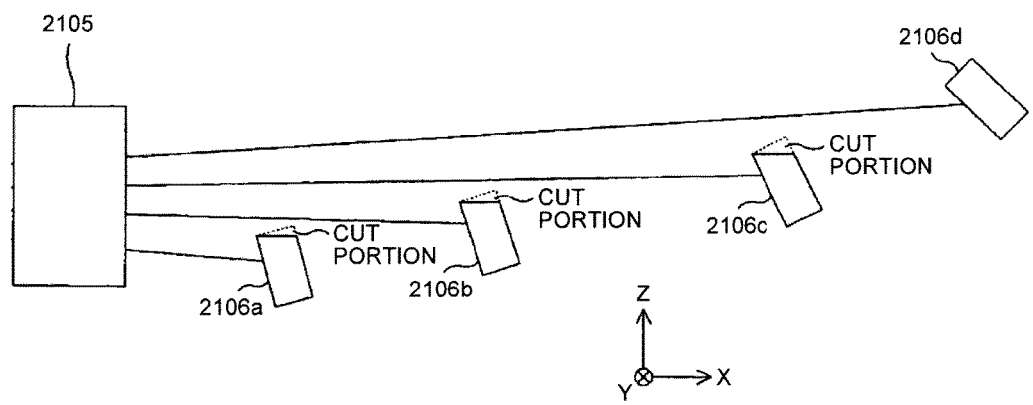
FIG. 31 is a view for describing a cut of a folding mirror.

In view of this, in the optical scanning device with the simplex scanning system, for example, at least a folding mirror for folding light passing through the first scanning lens 2105 may be formed such that a portion, which is at an end of a back side of a mirror surface and is close to an optical path of light directing to a different surface to be scanned, is cut as illustrated in FIG. 31 as one example. This configuration can allow the oblique incidence angle to be smaller.

In addition, in the optical scanning device with the simplex scanning system, for example, it is preferable that the number of the folding mirrors disposed on the optical path of light directing to the photoconductor drum most apart from the polygon mirror 2104 is less than the number of the folding mirrors disposed on the optical paths of lights directing to the other photoconductor drums.

This configuration can reduce the total number of the folding mirrors included in the scanning optical system, which can encourage a reduction in cost.

An optical path length from the polygon mirror 2104 to the photoconductor drum is the same for all photoconductor drums. If the number of the folding mirrors disposed on the optical path of light directing to the photoconductor drum most apart from the polygon mirror 2104 is increased, the reduction in the number of the folding mirrors disposed on the optical paths of other lights with the above relationship in number being maintained becomes difficult. It is physically very difficult to reduce a number of folding times for the light directing to the photoconductor drum close to the polygon mirror 2104 without changing the optical path length.

The above embodiment describes that the optical scanning device 2010 is used for a printer. However, the optical scanning device 2010 is suitably used for an image forming apparatus other than a printer, such as a copying machine, a facsimile, or a multifunction periphery collectively having these functions.

An optical scanning device according to the present invention can reduce a field curvature and a scanning line curvature as well as reduce a color shift caused by a temperature change or a processing error, while keeping miniaturization.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that individually scans a plurality of surfaces to be scanned with a plurality of lights in a main scanning direction, the optical scanning device comprising:
    a plurality of light sources, each of which corresponds to each of the plurality of surfaces to be scanned;
    a light deflector which includes at least one deflecting-reflecting surface, and on which a plurality of lights emitted from the plurality of light sources is incident from a direction inclined relative to a virtual plane that includes a normal line of the deflecting-reflecting surface and is orthogonal to the deflecting-reflecting surface; and
    a scanning optical system including a first scanning lens, a plurality of folding mirrors, and a plurality of second scanning lenses, each of the plurality of second scanning lenses corresponding to each of the plurality of surfaces to be scanned, the scanning optical system guiding each of the plurality of lights deflected by the light deflector to each of the plurality of surfaces to be scanned,
    wherein the plurality of second scanning lenses have a same shape,
    wherein a virtual line linking an origin in an equation representing a shape of an optical surface of the second scanning lens at an incidence side and an origin in an equation representing a shape of an optical surface at an emission side is defined as a reference axis, and a virtual line parallel to the reference axis and passing through a center of the second scanning lens is defined as a center axis,
    wherein the shape of the optical surface at the emission side is asymmetric with respect to a plane that includes the center axis, and is also asymmetric in a sub-scanning direction with respect to a plane that includes the reference axis, the sub-scanning direction being orthogonal to the main scanning direction,
    wherein the reference axis and the center axis are shifted from each other with respect to the sub-scanning direction such that the reference axis is spaced apart in the sub-scanning direction from the center axis that passes through the center of the second scanning lens, and
    wherein a difference in a number of folding mirrors disposed between the corresponding second scanning lens and the light deflector between light incident on the light deflector from a direction inclined to one side relative to the virtual plane and light incident on the light deflector from a direction inclined to another side is an odd number.

2. The optical scanning device according to claim 1, wherein
the number of the folding mirrors disposed on an optical path of light, which is incident on the light deflector from the direction inclined to one side relative to the virtual plane and deflected by the light deflector, and between the surface to be scanned corresponding to the light and the light deflector is an even number, and
the number of the folding mirrors disposed on an optical path of light, which is incident on the light deflector from the direction inclined to the other side relative to the virtual plane and deflected by the light deflector, and between the surface to be scanned corresponding to the light and the light deflector is an odd number.

3. The optical scanning device according to claim 1, wherein
the at least one deflecting-reflecting surface is a plurality of deflecting-reflecting surfaces including a first deflecting-reflecting surface and a second deflecting-reflecting surface,
the plurality of light sources includes a first light source and a second light source, wherein light emitted from the first light source is incident on the first deflecting-reflecting surface from the direction inclined to one side relative to the virtual plane, while light emitted from the second light source is incident on the second deflecting-reflecting surface from the direction inclined to one side relative to the virtual plane,
a number of the folding mirrors disposed on an optical path of light reflected on the first deflecting-reflecting surface and between the surface to be scanned corresponding to the light and the light deflector is an even number,
a number of the folding mirrors disposed on an optical path of light reflected on the second deflecting-reflecting surface and between the surface to be scanned corresponding to the light and the light deflector is an odd number, and
a difference between the number of the folding mirrors disposed on an optical path of light reflected on the first deflecting-reflecting surface and between the surface to be scanned corresponding to the light and the light deflector and the number of the folding mirrors disposed on an optical path of light reflected on the second deflecting-reflecting surface and between the surface to be scanned corresponding to the light and the light deflector is an odd number.

4. The optical scanning device according to claim 1, wherein
the plurality of light sources includes a first light source and a second light source, wherein light emitted from the first light source and light emitted from the second light source are incident on the same deflecting-reflecting surface of the light deflector from the direction inclined to the same side relative to the virtual plane, and
a difference between a number of the folding mirrors disposed on an optical path of light from the first light source reflected on the deflecting-reflecting surface and between the scanning lens corresponding to the light and the light deflector and a number of the folding mirrors disposed on an optical path of light from the second light source reflected on the deflecting-reflecting surface and between the scanning lens corresponding to the light and the light deflector is zero or an even number.

5. The optical scanning device according to claim 1, wherein
a scanning angle of the light deflector from an end at one side of a scanned region to an end at the other side is 80 degrees or more.

6. The optical scanning device according to claim 1, wherein
at least one of the plurality of folding mirrors is formed such that an end at a back side of a mirror surface is cut.

7. The optical scanning device according to claim 1, wherein
the number of the folding mirrors disposed on an optical path of light directing to the surface to be scanned located most apart from the light deflector is less than a number of the folding mirrors disposed on optical paths of lights directing to other surfaces to be scanned.

8. An image forming apparatus comprising:
a plurality of image bearers; and
the optical scanning device, according to claim 1, which scans each of the plurality of image bearers with light modulated according to corresponding image information.

* * * * *